United States Patent
Nakatomi et al.

(10) Patent No.: US 9,473,741 B2
(45) Date of Patent: Oct. 18, 2016

(54) TELECONFERENCE SYSTEM AND TELECONFERENCE TERMINAL

(71) Applicants: Masashi Nakatomi, Tokyo (JP); Yuuji Kasuya, Kanagawa (JP)

(72) Inventors: Masashi Nakatomi, Tokyo (JP); Yuuji Kasuya, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

(21) Appl. No.: 14/383,308

(22) PCT Filed: Mar. 19, 2013

(86) PCT No.: PCT/JP2013/058892
§ 371 (c)(1),
(2) Date: Sep. 5, 2014

(87) PCT Pub. No.: WO2013/141405
PCT Pub. Date: Sep. 26, 2013

(65) Prior Publication Data
US 2015/0029301 A1  Jan. 29, 2015

(30) Foreign Application Priority Data
Mar. 19, 2012 (JP) ................................ 2012-062251

(51) Int. Cl.
*H04N 7/14* (2006.01)
*H04N 7/15* (2006.01)

(52) U.S. Cl.
CPC ..................................... *H04N 7/15* (2013.01)

(58) Field of Classification Search
USPC .......................................... 348/14.01–14.09
See application file for complete search history.

(56) References Cited

U.S. PATENT DOCUMENTS

2005/0062844 A1* 3/2005 Ferren ...................... H04N 7/15
348/14.08
2007/0285505 A1  12/2007 Korneliussen
(Continued)

FOREIGN PATENT DOCUMENTS

| JP | 09-271006 | 10/1997 |
|---|---|---|
| JP | 11-103499 | 4/1999 |
| JP | 2000-175171 | 6/2000 |
| JP | 2009-303083 | 12/2009 |
| JP | 2010-157906 | 7/2010 |
| JP | 2011-030063 | 2/2011 |
| JP | 2011-066745 | 3/2011 |
| WO | WO 2007/142533 A1 | 12/2007 |

OTHER PUBLICATIONS

International Search Report and Written Opinion issued May 21, 2013 in PCT/JP2013/058892 filed on Mar. 19, 2013.
Extended European Search Report issued Mar. 19, 2015 in Patent Application No. 13764038.9.
A. Romanow, et al., "Use Cases for Telepresence Multi-streams; draft-ietf-clue-telepresence-use-cases-02.txt" Telepresence Use Cases, XP015080073, Jan. 9, 2012, pp. 1-16.

*Primary Examiner* — Maria El-Zoobi
(74) *Attorney, Agent, or Firm* — Oblon, McClelland, Maier & Neustadt, L.L.P

(57) ABSTRACT

A teleconference terminal includes a positional relationship determining unit, a video switching unit, a first video output unit, and a second video output unit. The positional relationship determining unit sets relationship information indicating a displaying position relationship between a location video received from another teleconference terminal and shared information shared among a plurality of locations on the local teleconference terminal based on relationship information indicating a displaying position relationship between the location video and the shared information set on the other teleconference terminal. The video switching unit displays the location video received from the other teleconference terminal and shared information on a first display unit and a second display unit in the displaying position relationship specified in the relationship information set by the positional relationship determining unit.

6 Claims, 21 Drawing Sheets

(56) References Cited

U.S. PATENT DOCUMENTS

| | | |
|---|---|---|
| 2008/0143818 A1 | 6/2008 | Ferren et al. |
| 2008/0184115 A1* | 7/2008 | Back et al. .................. 715/702 |
| 2008/0204542 A1 | 8/2008 | Ferren et al. |
| 2008/0204543 A1 | 8/2008 | Ferren et al. |
| 2008/0204544 A1 | 8/2008 | Ferren et al. |
| 2008/0204545 A1 | 8/2008 | Ferren et al. |
| 2008/0246834 A1* | 10/2008 | Lunde .................. H04N 7/142 348/14.09 |
| 2012/0236108 A1 | 9/2012 | Ferren et al. |
| 2013/0155174 A1 | 6/2013 | Ferren et al. |

* cited by examiner

LEFT

FIG.7
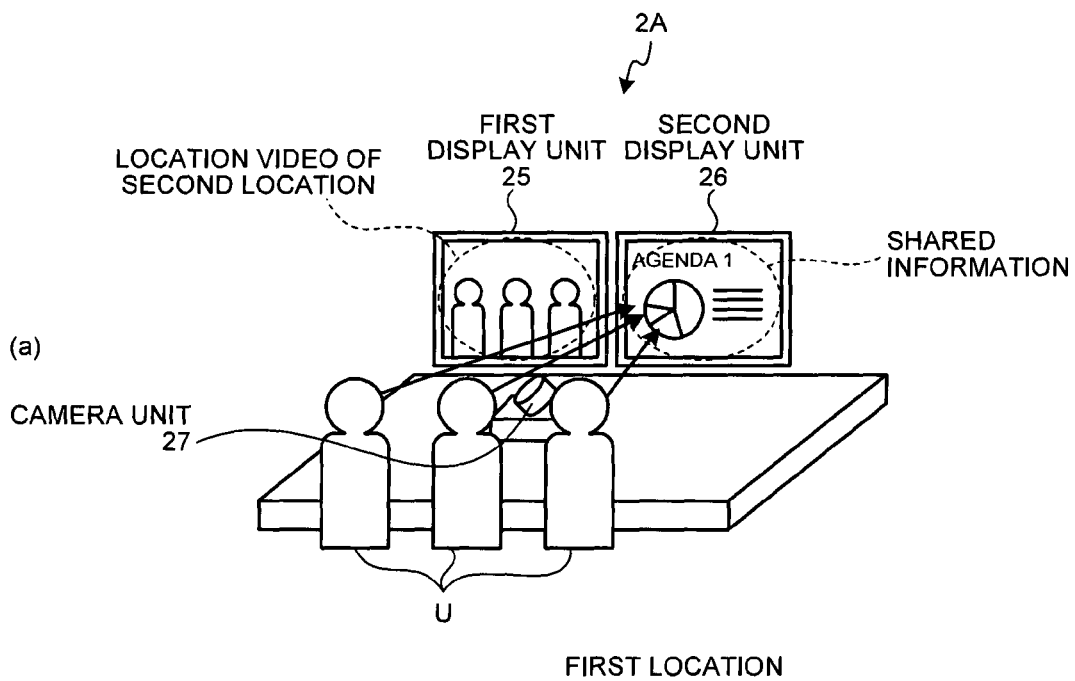
(a) LOCATION VIDEO OF SECOND LOCATION — FIRST DISPLAY UNIT 25 — SECOND DISPLAY UNIT 26 — SHARED INFORMATION — CAMERA UNIT 27 — U — FIRST LOCATION
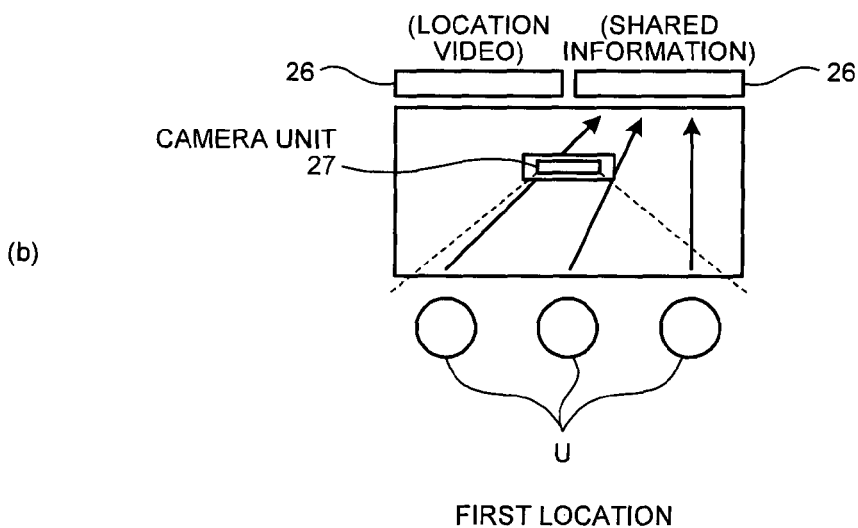
(b) (LOCATION VIDEO) 26 — (SHARED INFORMATION) 26 — CAMERA UNIT 27 — U — FIRST LOCATION
(SCHEMATIC VIEWING (a) FROM TOP)

TELECONFERENCE SYSTEM AND TELECONFERENCE TERMINAL

TECHNICAL FIELD

The present invention relates to a teleconference system and teleconference terminal.

BACKGROUND ART

Conventionally known is a teleconference system (also referred to as an electronic conference system) that is provided with a plurality of teleconference terminals each of which is capable of displaying a video of a space such as a conference room at a geographically remote location (hereinafter, sometimes referred to as a "location video") and content such as information of a document shared among a plurality of locations across which an electronic conference is held (hereinafter, sometimes referred to as "shared information"), side by side on one screen (see Japanese Patent Application Laid-open No. 11-103499, for example).

However, in a conventional teleconference system, when a location video and shared information are displayed at fixed positions (for example, on the left side and the right side in a direction facing the display screen, respectively) among the different teleconference terminals participating the electronic conference, participants in the location video might be displayed on a teleconference terminal in a manner facing the opposite direction of the shared information displayed as well on the teleconference terminal. As a result, in such a conventional teleconference system, the participants in the location video might give an impression that they are not interested in the meeting to participants viewing the location video.

Such a situation can be prevented by allowing participants to manually switch the positions at which the shared information and the location video are displayed depending on the locations when such a situation occurs, but such a switching operation is cumbersome for the participants.

The present invention is to overcome such challenges in the conventional technology, and an object of the present invention is to provide a teleconference system and a teleconference terminal that can prevent participants in a location video from appearing to be looking at an awkward direction.

DISCLOSURE OF INVENTION

According to the present invention, in consideration of the conventional art, there is provided: a teleconference system comprising a plurality of teleconference terminals deployed in a plurality of locations, wherein each of the teleconference terminals comprises: a positional relationship determining unit configured to set relationship information indicating a displaying position relationship between a location video received from another teleconference terminal and shared information shared among such locations on the local teleconference terminal based on relationship information indicating a displaying position relationship between a location video and the shared information set on the other teleconference terminal; and a display control unit configured to display the location video received from the other teleconference terminal and the shared information on a display unit in the displaying position relationship specified in the relationship information set by the positional relationship determining unit.

The present invention also provides a teleconference terminal comprising: a positional relationship determining unit configured to set relationship information indicating a displaying position relationship between a location video received from another teleconference terminal and shared information shared among a plurality of locations on the local teleconference terminal based on relationship information indicating a displaying position relationship between a location video and the shared information set on the other teleconference terminal; and a display control unit configured to displays the location video received from the other teleconference terminal and the shared information on a display unit in the displaying position relationship specified in the relationship information set by the positional relationship determining unit.

The present invention also provides a teleconference terminal comprising: an initial positional relationship determining unit configured to set an initial value of relationship information indicating a displaying position relationship between a location video received from another teleconference terminal and shared information shared among a plurality of locations; a positional relationship retaining unit configured to store the relationship information set by the initial positional relationship determining unit in a storage unit; a positional relationship transmitting unit configured to transmit the relationship information retained by the positional relationship retaining unit to another teleconference terminal when a connection request is received from the other teleconference terminal; and a display control unit configured to display the location video received from the other teleconference terminal and the shared information on a display unit in the displaying position relationship specified in the relationship information stored by the positional relationship retaining unit in the storage unit.

The present invention also provides a teleconference terminal comprising: a positional relationship receiving unit configured to receive relationship information indicating a displaying position relationship between a location video received from another teleconference terminal and shared information shared among a plurality of locations transmitted from the other teleconference terminal; a positional relationship determining unit configured to set relationship information indicating a displaying position relationship between a location video and the shared information on the local teleconference terminal based on the relationship information received by the positional relationship receiving unit; a positional relationship retaining unit configured to store the relationship information set by the positional relationship determining unit in a storage unit; and a display control unit configured to display the location video thus received and the shared information on a display unit in the displaying position relationship specified in the relationship information stored by the positional relationship retaining unit in the storage unit.

According to the present invention, when a location video and shared information are both displayed on a teleconference terminal, the participant in the location video can be prevented from appearing to be looking at an awkward direction.

BRIEF DESCRIPTION OF DRAWINGS

FIG. 7 is schematic for explaining an advantageous effect achieved by the first embodiment;

BEST MODES FOR CARRYING OUT THE INVENTION

Embodiments of the present invention will now be explained with reference to the appended drawings.

First Embodiment

Figure 1:
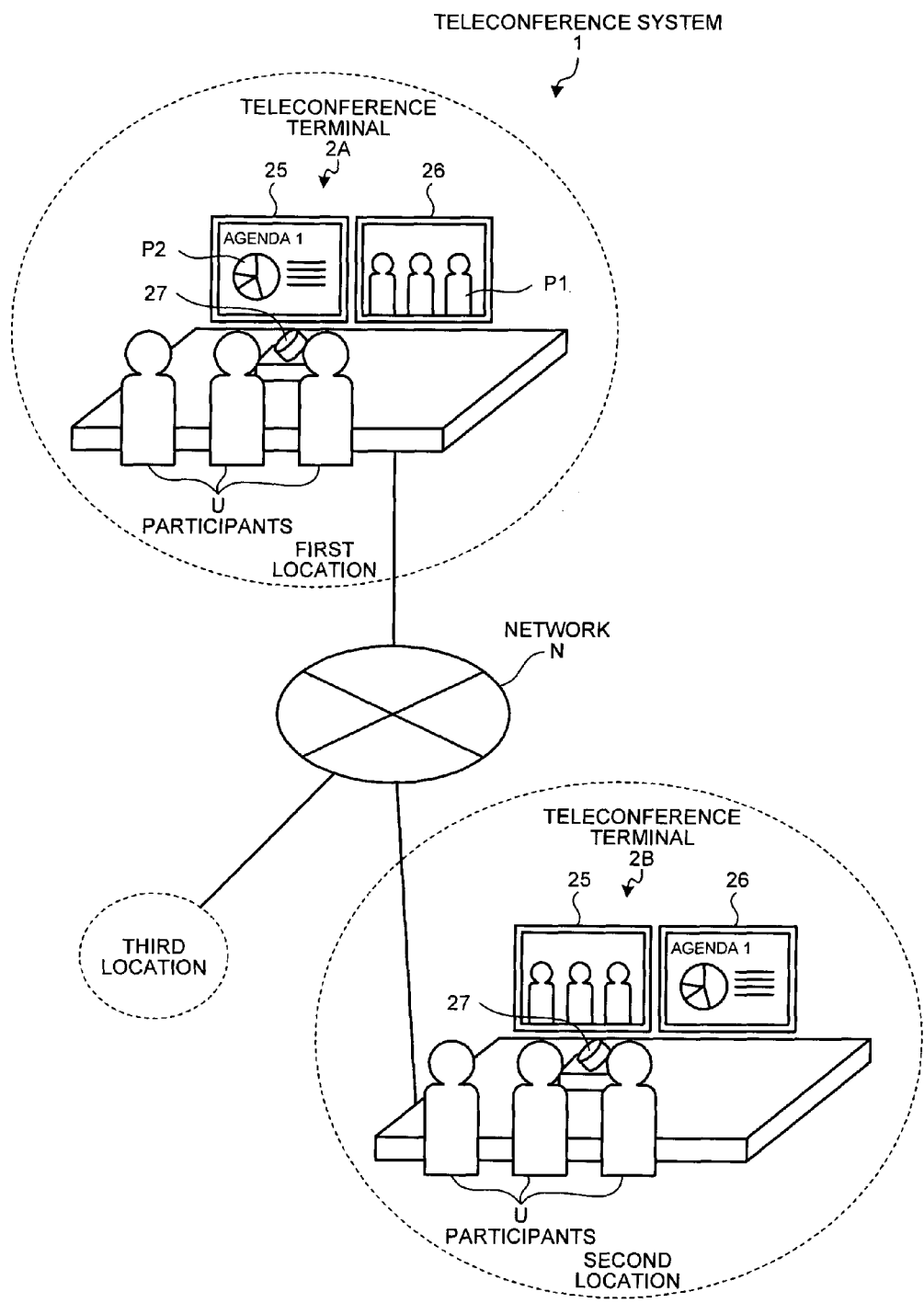
FIG. 1 is a schematic generally illustrating a system configuration of a teleconference system according to a first embodiment of the present invention.

To begin with, a system configuration of a teleconference system 1 according to a first embodiment of the present invention will be explained. FIG. 1 is a schematic generally illustrating a system configuration of the teleconference system 1 according to the first embodiment.

As illustrated in FIG. 1, the teleconference system 1 includes a plurality of teleconference terminals 2. The teleconference terminals 2 are communicatively connected to each other over a network N.

The teleconference terminals 2 are deployed in a plurality of geographically remote locations (e.g., a first location, a second location, and a third location), respectively, and each of the teleconference terminals 2 outputs a video in the corresponding location (hereinafter, sometimes referred to as a "location video") or sound in the corresponding location (hereinafter, sometimes referred to as a "location sound"). The teleconference terminals 2 according to the first embodiment is capable of displaying a location video P1 and another piece of content such as information of a document shared among the locations (hereinafter, sometimes referred to as "shared information (P2)") side by side, as illustrated in FIG. 1.

In other words, the teleconference system 1 enables an electronic conference to be held across a plurality of geographically remote locations by exchanging location videos and location sound across the locations over the network N using the teleconference terminals 2.

Figure 2:
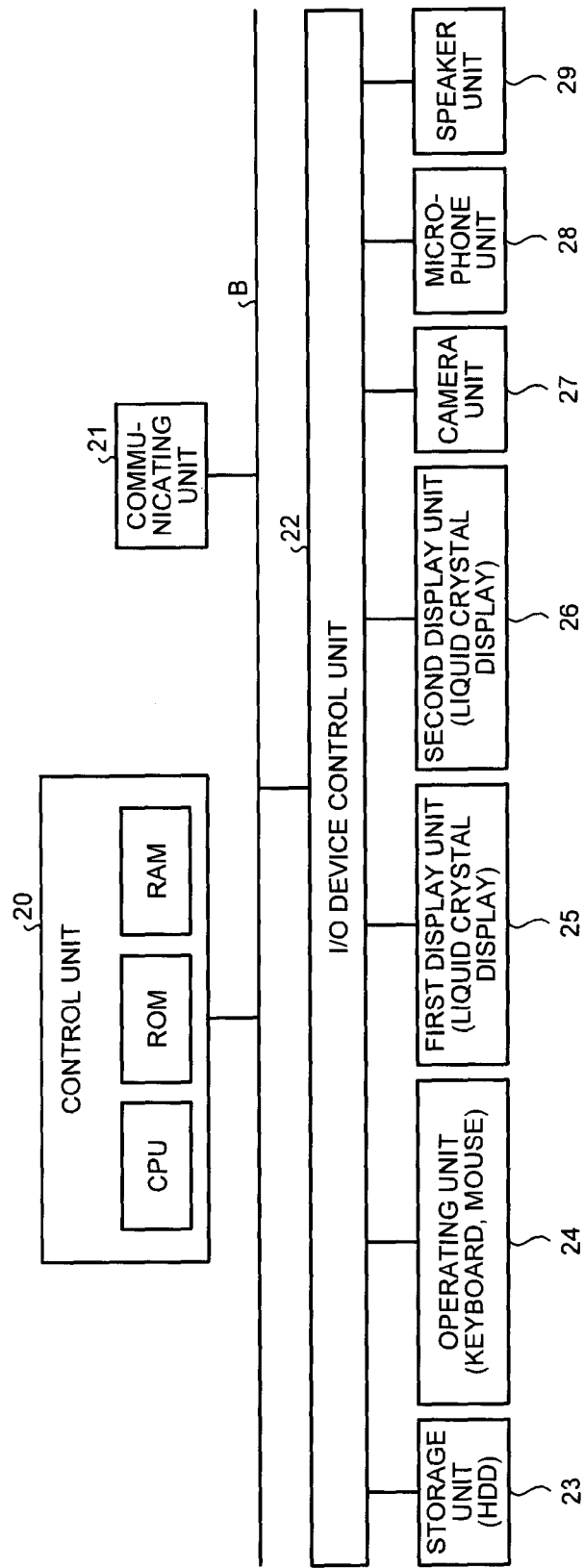
FIG. 2 is a block diagram illustrating a hardware configuration of a control system in a teleconference terminal according to the first embodiment.

In the example in FIG. 1, only the first location, the second location, and the third location are illustrated as the locations where the teleconference terminals 2 are deployed. However, the configuration is not limited to the example illustrated, and the configuration having only two locations including the first location and the second location or a configuration having four or more locations are still possible. A hardware configuration of a control system in the teleconference terminal 2 according to the first embodiment will now be explained. FIG. 2 is a block diagram illustrating a hardware configuration of a control system of the teleconference terminal 2 according to the first embodiment. As illustrated in FIG. 2, the teleconference terminal 2 has a hardware configuration using a general computer, and includes a control unit 20, a communicating unit 21, and an input-and-output (I/O) device control unit 22 that are connected to a bus B, for example. The control unit 20 includes a central processing unit (CPU), a read-only memory (ROM), and a random access memory (RAM).

The I/O device control unit 22, a storage unit 23, an operating unit 24, a first display unit 25, a second display unit 26, a camera unit 27, a microphone unit 28, and a speaker unit 29 are connected to the control unit 20 via the bus B.

The control unit 20 controls operations of various components connected via the I/O device control unit 22 by causing the CPU to load computer programs stored in the ROM, the storage unit 23, or the like onto the RAM and to execute the computer programs. The control unit 20 also controls operations of transmitting and receiving various types of data to and from other devices connected via the communicating unit 21 and the network N. The communicating unit 21 transmits and receives various types of data such as a location video or location sound to and from the other teleconference terminals 2 over the network N.

The storage unit 23 stores therein the computer programs executed by the CPU in the control unit 20 and data. The storage unit 23 also stores therein content for displaying various types of information such as a document used in an electronic conference on the first display unit 25 or the second display unit 26. An example of such content includes content for displaying shared information such as a document shared among the teleconference terminals 2 that are deployed in different locations and displayed on the first display unit 25 or the second display unit 26. The storage unit 23 is realized as a hard disk drive (HDD) or a solid state drive (SSD), for example.

The operating unit 24 receives various operations of participants who are using the teleconference terminal 2. The operating unit 24 is realized as a keyboard, a mouse, a touch panel, and the like.

The first display unit 25 and the second display unit 26 display various types of information such as a location video and shared information related to an electronic conference. Specifically, the first display unit 25 and the second display unit 26 display a location video shot by the camera unit 27 on a peer teleconference terminal 2 (in particular, a location video including an image of participants who are in a peer location, for example), and shared information, respectively. The first display unit 25 and the second display unit 26 are realized as a liquid crystal display, for example.

In the first embodiment, the first display unit 25 is positioned on the left side and the second display unit 26 is positioned on the right side in the view of participants U directly facing the teleconference terminal 2, as illustrated in FIG. 1.

The camera unit 27 shoots a video of an area around the camera unit 27. Specifically, the camera unit 27 shoots a video of participants who are in a space such as a conference room where the teleconference terminal 2 with the camera unit 27 is deployed. The camera unit 27 is realized as a digital video camera capable of being rotated and zooming, and capable of shooting a live video, for example.

The microphone unit 28 collects sound around the microphone unit 28. Specifically, the microphone unit 28 collects the voice of participants who are in a space such as a conference room where the teleconference terminal 2 with the microphone unit 28 is deployed.

The speaker unit 29 outputs various types of sound. Specifically, the speaker unit 29 outputs the voice of the participants collected by the microphone unit 28 on the peer teleconference terminal 2.

Figures 3, 4:
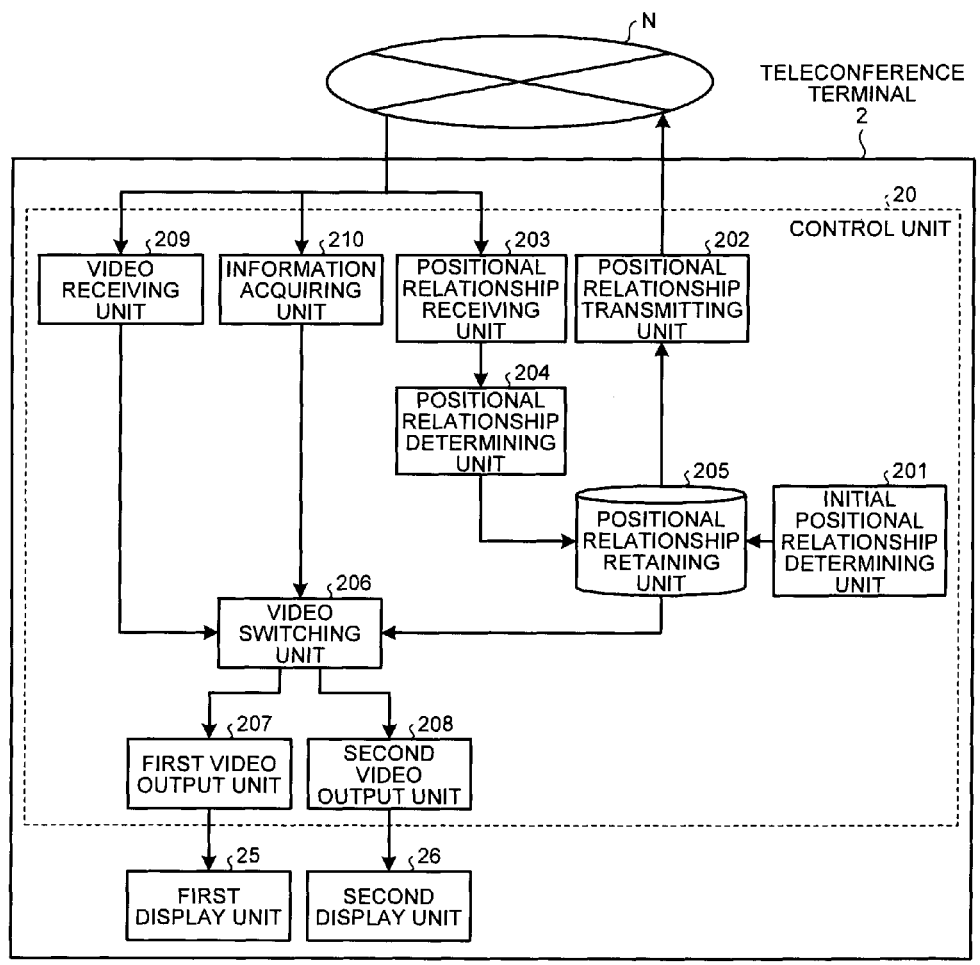
FIG. 3 is a block diagram illustrating a functional configuration of the teleconference terminal.
FIG. 4 is a schematic illustrating an exemplary configuration of displaying position relationship information retained by a positional relationship retaining unit.

A functional configuration of the teleconference terminal 2 will now be explained. FIG. 3 is a block diagram illustrating a functional configuration of the teleconference terminal 2.

As illustrated in FIG. 3, by causing the CPU to load a computer program stored in the ROM or the like onto the RAM, and to execute the computer program, the control unit 20 included in the teleconference terminal 2 functions as an initial positional relationship determining unit 201, a positional relationship transmitting unit 202, a positional relationship receiving unit 203, a positional relationship determining unit 204, a positional relationship retaining unit 205, a video switching unit 206, a first video output unit 207, a second video output unit 208, a video receiving unit 209, and an information acquiring unit 210.

The initial positional relationship determining unit 201 sets displaying position relationship information on the local teleconference terminal 2, and causes the positional relationship retaining unit 205 to retain the displaying position relationship information thus set.

The displaying position relationship information herein means information indicating which of the display screen on the first display unit 25 or the display screen on the second display unit 26 in the local teleconference terminal 2 each of the location video of another teleconference terminal 2 and the shared information is to be displayed, among the first display unit 25 positioned on the left side and the second display unit 26 positioned on the right side in the view of participant directly facing the display screens on the local teleconference terminal 2. Specifically, for example, an example of the displaying position relationship information includes information indicating "left" (see FIG. 4) or "right". The information indicating "left" specifies that "a location video is positioned on the left side of shared information". The information indicating "right" specifies that "a location video is positioned on the right side of shared information".

The displaying position relationship information initially set by the initial positional relationship determining unit 201 may be set freely depending on each of the teleconference terminals 2. Specifically, when a teleconference terminal 2 has a larger display screen on the first display unit 25 positioned on the left side than that on the second display unit 26 positioned on the right side, for example, because it is more convenient to display the shared information on the first display unit 25 having a larger display screen, the initial positional relationship determining unit 201 may set "right" as the displaying position relationship information.

When the local teleconference terminal 2 receives a request for establishing a connection from another teleconference terminal 2, the positional relationship transmitting unit 202 gives permission to the connection request. Once the connection is established, the positional relationship transmitting unit 202 transmits the displaying position relationship information (for example, "left") retained by the positional relationship retaining unit 205 to the requesting teleconference terminal 2.

When the local teleconference terminal 2 issues a request for establishing a connection to another teleconference terminal 2, the local teleconference terminal 2 issues the request to the teleconference terminal 2, and once the connection is established, the positional relationship receiving unit 203 receives displaying position relationship information retained by the positional relationship retaining unit 205 in the other teleconference terminal 2 from the other teleconference terminal 2.

The positional relationship determining unit 204 sets the displaying position relationship information on the local teleconference terminal again based on the displaying position relationship information received by the positional relationship receiving unit 203, and causes the positional relationship retaining unit 205 to retain the displaying position relationship information thus set again.

The positional relationship retaining unit 205 stores and retains the displaying position relationship information set by the initial positional relationship determining unit 201 or the positional relationship determining unit 204 in a given storage area such as a read-only memory (RAM). FIG. 4 is a schematic illustrating an exemplary configuration of the displaying position relationship information retained by the positional relationship retaining unit 205. In the example illustrated in FIG. 4, information "left" is retained by the positional relationship retaining unit 205.

The video switching unit 206 then determines if each of the location video of the peer location and the shared information is to be displayed on which of the first display unit 25 positioned on the left side and the second display unit 26 positioned on the right side, based on the displaying position relationship information retained by the positional relationship retaining unit 205, and outputs the location video and the shared information to the corresponding video output unit (the first video output unit 207 or the second video output unit 208) based on the determination result. Each of the first video output unit 207 and the second video output unit 208 outputs corresponding one of the location video and the shared information received from the video switching unit 206 onto the display unit (the first display unit 25 or the second display unit 26). The first display unit 25 and the second display unit 26, display the location video and the shared information thus received on the display screens, respectively.

The video receiving unit 209 receives a location video from a peer teleconference terminal 2 over the network N.

The information acquiring unit 210 acquires shared information from a peer teleconference terminal 2 over the network N.

A process performed by the teleconference system 1 according to the first embodiment will now be explained.

Figure 5:
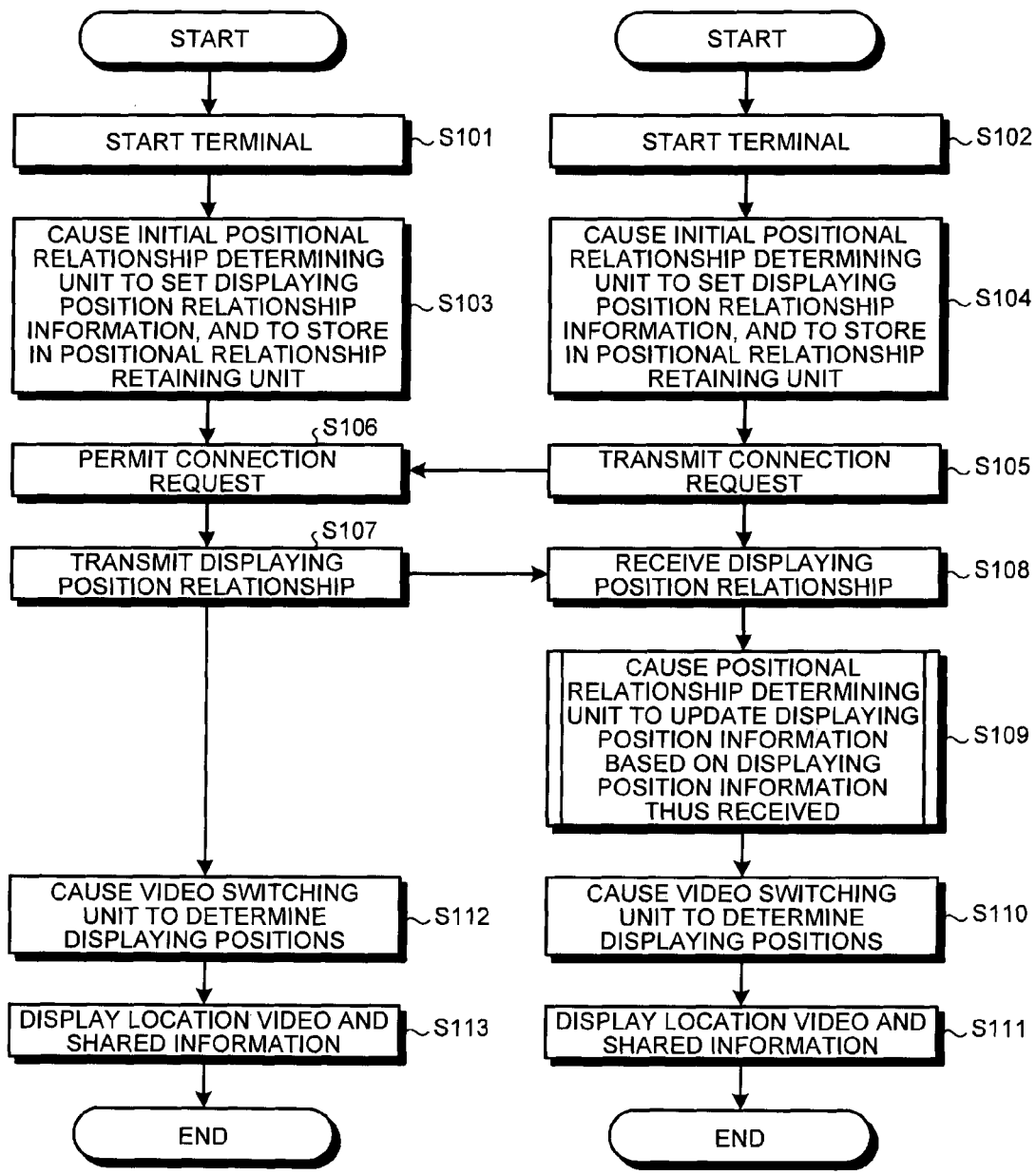
FIG. 5 is a flowchart illustrating a process performed by the teleconference system.

FIG. 5 is a flowchart illustrating a process performed by the teleconference system 1. Illustrated in this example is a process performed when a teleconference terminal 2 requests a connection from another teleconference terminal 2. Used in the explanation below is an example in which a teleconference terminal 2B deployed in the second location requests a connection from a teleconference terminal 2A deployed in the first location.

As illustrated in FIG. 5, when the teleconference terminal 2A and the teleconference terminal 2B are started in the first location and the second location, respectively (Step S101 and Step S102), the initial positional relationship determining unit 201 in each of the teleconference terminal 2A and the teleconference terminal 2B operates to set the displaying position relationship information on the local teleconference terminal (for example, "left"), and causes the positional relationship retaining unit 205 to retain the displaying position relationship information thus set (Step S103 and Step S104).

The teleconference terminal 2B then transmits a connection request in response to a connection requesting operation performed by a participant (Step S105). Before transmitting a connection request, a participant specifies shared information shared between the first location and the second location using the teleconference terminal 2B. The teleconference terminal 2B then transmits the connection request including the shared information thus specified.

The teleconference terminal 2A receiving the connection request permits the connection request (Step S106). The teleconference terminal 2A then transmits the displaying position relationship information (for example, "left") retained by the positional relationship retaining unit 205 to the teleconference terminal 2B (Step S107).

In the teleconference terminal 2B, the positional relationship receiving unit 203 receives the displaying position relationship information thus transmitted (Step S108). The positional relationship determining unit 204 then sets the displaying position relationship information (for example, "right") again based on the displaying position relationship information thus received (for example, "left"), and causes the positional relationship retaining unit 205 to retain the displaying position relationship information thus set again (Step S109). Step S109 will be explained later in detail.

In the teleconference terminal 2B, the video switching unit 206 determines the displayed position for the location video of the peer location and the shared information based on the displaying position relationship information retained by the positional relationship retaining unit 205 (Step S110). In other words, when "left" is set as the displaying position relationship information, the video switching unit 206 determines to display the location video on the first display unit 25 positioned on the left side and to display the shared information on the second display unit 26 positioned on the right side, and outputs the location video to the first video output unit 207 associated with the first display unit 25 positioned on the left side, and outputs the shared information to the second video output unit 208 associated with the second display unit 26 positioned on the right side. When "right" is set as the displaying position relationship information, the video switching unit 206 determines to display the location video on the second display unit 26 positioned on the right side, and to display the shared information on the first display unit 25 positioned on the left side, and outputs the location video to the second video output unit 208 associated with the second display unit 26 positioned on the right side, and outputs the shared information to the first video output unit 207 associated with the first display unit 25 positioned on the left side.

In the teleconference terminal 2B, the location video and the shared information are then displayed on the display screens based on the location video and the shared information received from the first video output unit 207 associated with the first display unit 25 and the second video output unit 208 associated with the second display unit 26, respectively (Step S111).

In the teleconference terminal 2A, after the displaying position relationship information is transmitted at Step S107, the video switching unit 206 determines the positions at which the location video of the peer location and the shared information are displayed based on the displaying position relationship information retained by the positional relationship retaining unit 205, following the same process as Step S110 (Step S112). At Step S113, in the teleconference terminal 2A, the location video and the shared information are displayed on the display screens based on the location video and the shared information received from the first video output unit 207 associated with the first display unit 25 and the second video output unit 208 associated with the second display unit 26 (Step S113).

Figure 6:
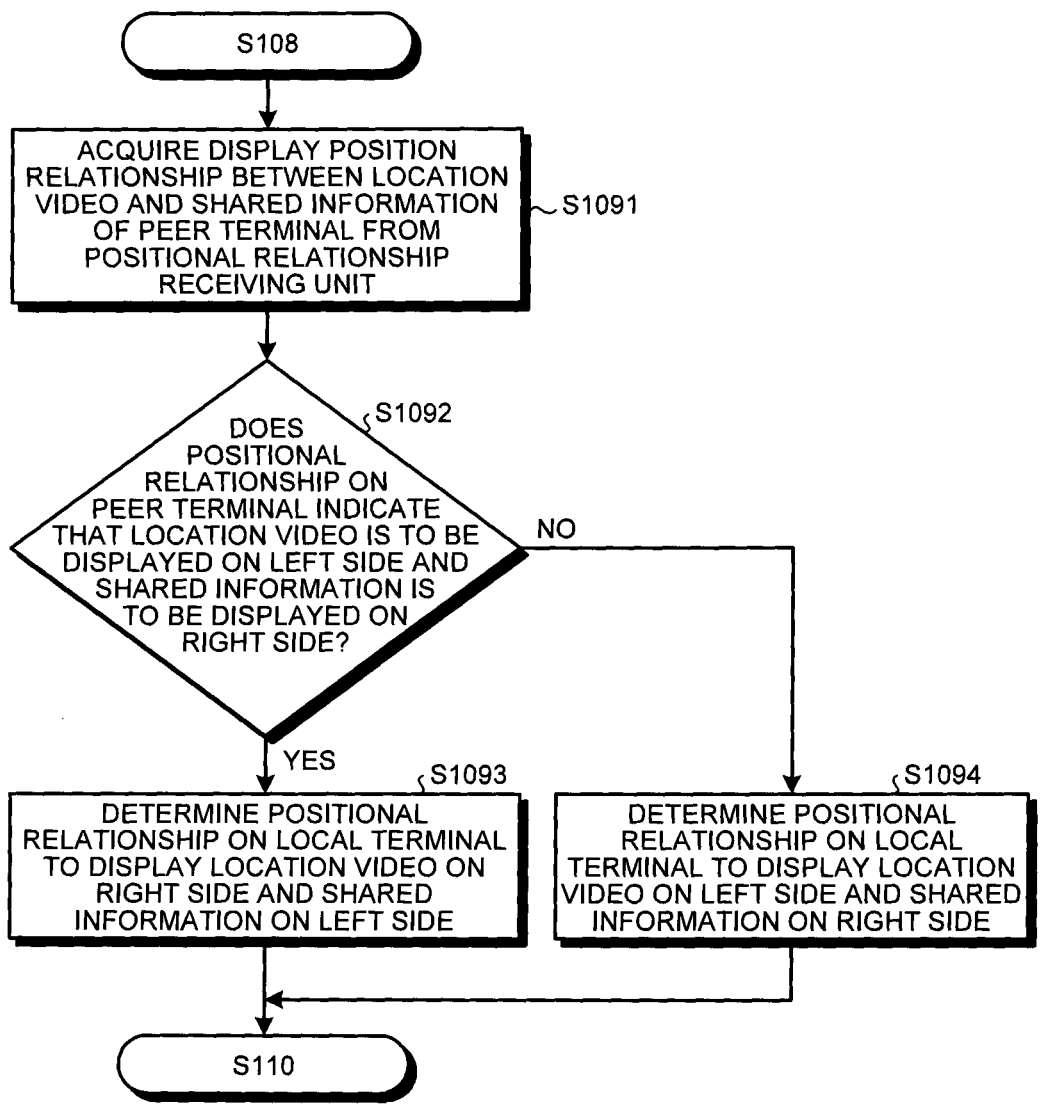
FIG. 6 is a flowchart explaining a process performed by a positional relationship determining unit at Step S109 illustrated in FIG. 5 in detail.

The process performed by the positional relationship determining unit 204 at Step S109 in FIG. 5 will now be explained in detail. FIG. 6 is a flowchart explaining the process performed by the positional relationship determining unit 204 at Step S109 illustrated in FIG. 5 in detail. Used in the explanation below as an example is a process performed by the positional relationship determining unit 204 in the teleconference terminal 2B deployed in the second location.

As illustrated in FIG. 6, the positional relationship determining unit 204 in the teleconference terminal 2B deployed in the second location acquires the displaying position relationship information set on the teleconference terminal 2A being a peer from the positional relationship receiving unit 203 after the process at Step S108 is completed (Step S1091), and determines if the displaying position relationship information thus acquired is set to "left", that is, to display the location video on the left side of the shared information on the teleconference terminal 2A being a peer (Step S1092).

As a result of the determination, if the displaying position relationship information is set to "left", that is, to display the location video on the left side of the shared information on the teleconference terminal 2A being a peer (Yes at Step S1092), the positional relationship determining unit 204 sets "right" as the displaying position relationship information on the local teleconference terminal (on the teleconference terminal 2B). In other words, the positional relationship determining unit 204 sets to display the location video on the right side of the shared information (Step S1093).

As a result of the determination, if "right" is set as the displaying position relationship information, that is, to display the location video on the right side of the shared information on the teleconference terminal 2A being a peer (No at Step S1092), the positional relationship determining unit 204 sets "left" as the displaying position relationship information on the local teleconference terminal (on the teleconference terminal 2B). In other words, the positional relationship determining unit 204 sets to display the location video on the left side of the shared information (Step S1094).

Figure 22:
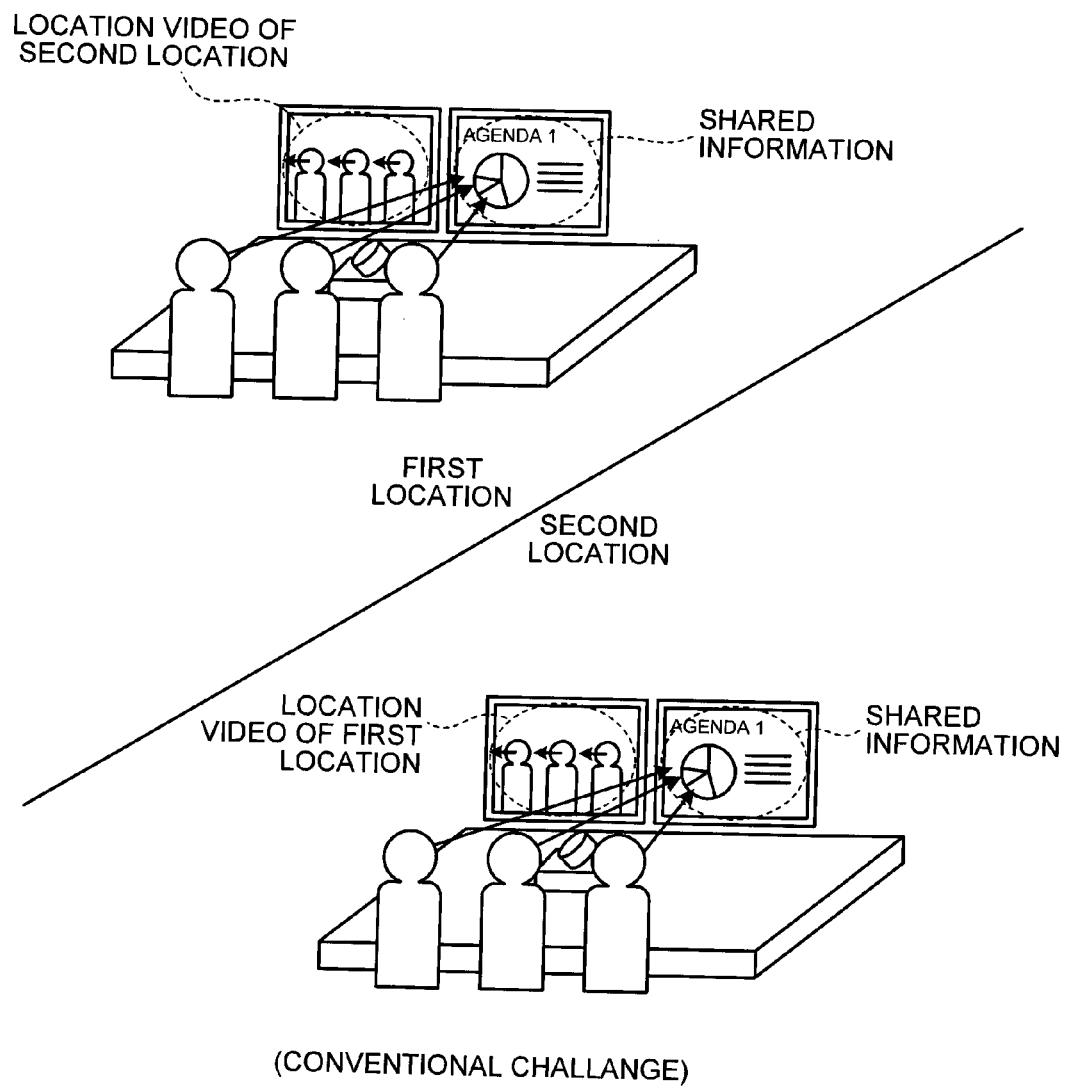
FIG. 22 is a schematic for explaining a conventional challenge.

In other words, according to the first embodiment explained above, a conventional challenge illustrated in FIG. 22 can be overcome. In other words, conventionally, when both of the location video and the shared information are displayed as illustrated in FIG. 22, participants in the location video are displayed in a manner facing the opposite side of the shared information displayed on the display screen, giving an impression that the participants in the location video are not interested in the meeting to the participants viewing the location video.

In response to this challenge, according to the first embodiment, the local teleconference terminal 2 is set to display a location video and shared information received from another teleconference terminal 2 at opposite positions from the position at which the other teleconference terminal 2 displays the location video and the shared information received from the other teleconference terminal 2 (from the local teleconference terminal). Therefore, when location video and shared information are both displayed on a teleconference terminal 2, the teleconference terminal 2 is capable of displaying the participants in the location video in a manner appearing to be looking at the shared information and thus interested in the electronic conference. In other words, according to the first embodiment, when location video and shared information are both displayed on the teleconference terminal 2, the teleconference terminal 2 can prevent the participants in the location video from appearing to be looking at an awkward direction.

Figure 8:
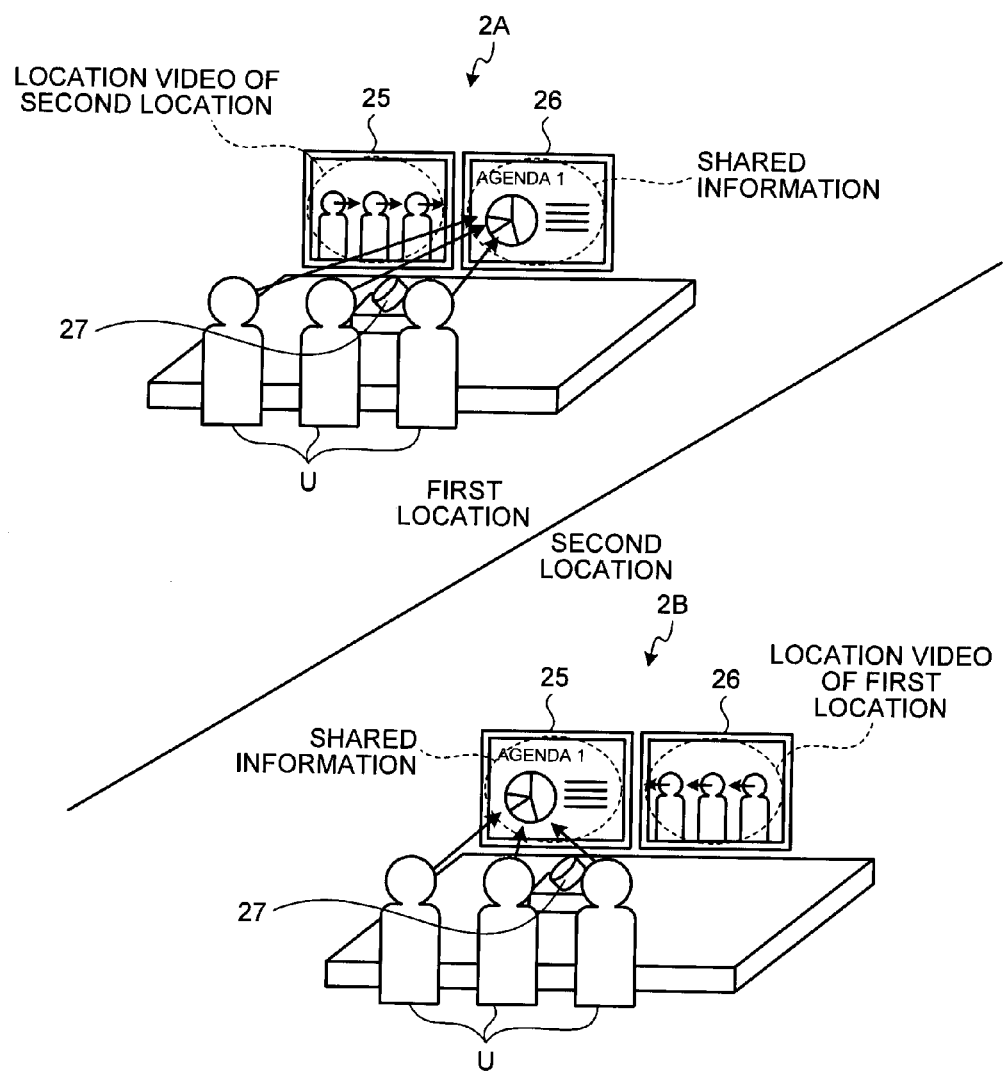
FIG. 8 is a schematic for explaining an advantageous effect achieved by the first embodiment.

More specifically, according to the first embodiment, for example, when the teleconference terminal 2B in the second location requests a connection from the teleconference terminal 2A in the first location that is set to display the location video on the left side of the shared information, as illustrated in FIG. 7, the location video is displayed on the right side of the shared information on the teleconference terminal 2B in the second location, as illustrated in FIG. 8, through the processes illustrated in FIGS. 5 and 6. In this manner, on the teleconference terminal 2A in the first location, the participants in the second location displayed on the first display unit 25 are displayed to be looking at the shared information displayed on the second display unit 26. Furthermore, on the teleconference terminal 2B in the second location, the participants in the first location displayed on the second display unit 26 are displayed to be looking at the shared information displayed on the first display unit 25. Therefore, a sense of the participants paying attention to shared information such as a document can be created smoothly among a plurality of locations where the electronic conference is being held.

A variation of the first embodiment will now be explained.

Explained in the first embodiment is a configuration in which the teleconference terminal 2 in each of the locations has a function for transmitting and receiving the displaying position relationship information, as illustrated in FIG. 3, but the present invention is not limited thereto. Alternatively, only the function for transmitting the displaying position relationship information may be provided as illustrated in FIG. 9, or only the function for receiving the displaying position relationship information may be provided as illustrated in FIG. 10, depending on the teleconference terminals 2.

Figure 9:
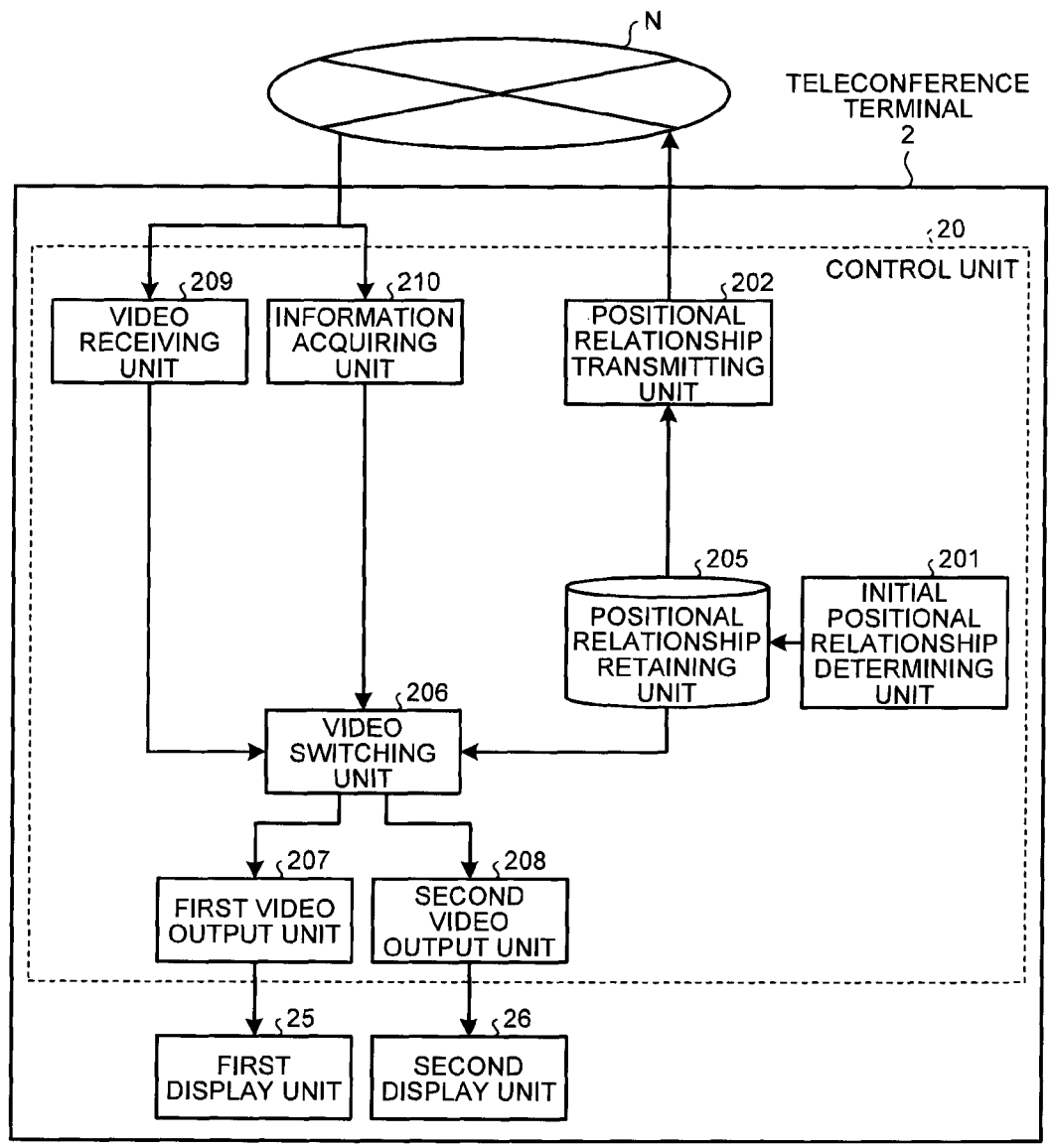
FIG. 9 is a block diagram illustrating a functional configuration according to a variation of the first embodiment.

In a functional configuration in which the displaying position relationship information is only transmitted, the positional relationship receiving unit 203 and the positional relationship determining unit 204 in FIG. 3 are omitted, as illustrated in FIG. 9. In a functional configuration in which the displaying position relationship information is only received, the initial positional relationship determining unit 201 and the positional relationship transmitting unit 202 in FIG. 3 are omitted, as illustrated in FIG. 10.

More specifically, in the teleconference terminal 2 having the functional configuration illustrated in FIG. 9, the initial positional relationship determining unit 201 sets an initial value of the relationship information indicating the positional relationship in which a location video received from another teleconference terminal 2 and shared information shared among a plurality of locations are displayed. The positional relationship retaining unit 205 stores the relationship information set by the initial positional relationship determining unit 201 in a storage unit such as the RAM or the storage unit 23. The positional relationship transmitting unit 202 then transmits the relationship information retained by the positional relationship retaining unit 205 to another teleconference terminal 2 when a connection request is received from the other teleconference terminal 2. The video switching unit 206, the first video output unit 207, and the second video output unit 208 being a display control unit display the location video received from another teleconference terminal 2 and the shared information on the first display unit 25 and the second display unit 26 being a display unit in a displaying position relationship specified by the relationship information stored by the positional relationship retaining unit 205 in the storage unit.

Figure 10:
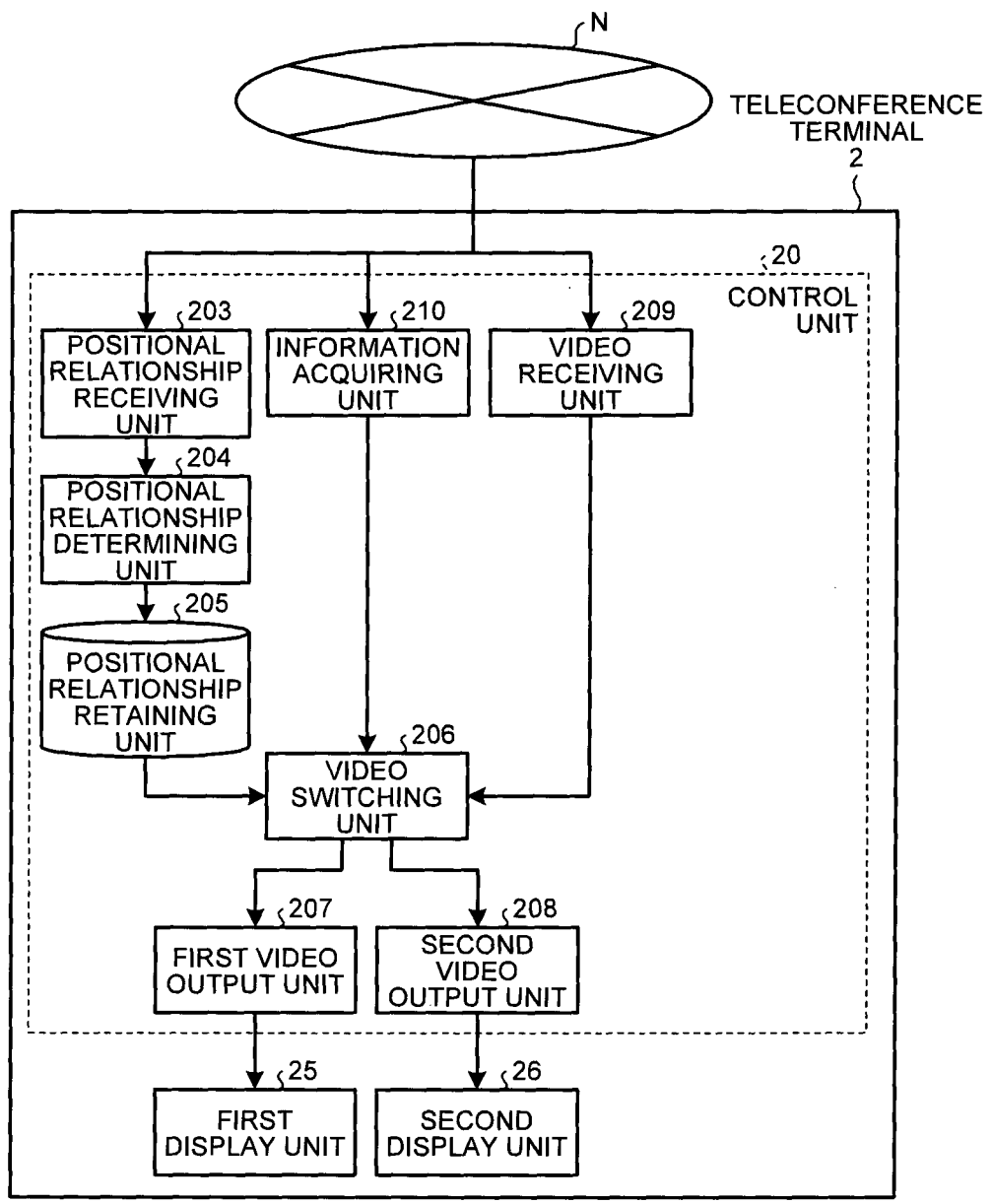
FIG. 10 is a block diagram illustrating a functional configuration according to another variation of the first embodiment.

In the teleconference terminal 2 having the functional configuration illustrated in FIG. 10, the positional relationship receiving unit 203 receives relationship information indicating the displaying position relationship between the location video received from another teleconference terminal 2 and shared information shared among a plurality of locations. The positional relationship determining unit 204 sets relationship information indicating a displaying position relationship between the location video and the shared information on the local teleconference terminal based on the relationship information received by the positional relationship receiving unit 203. The positional relationship retaining unit 205 stores the relationship information set by the positional relationship determining unit 204 in a storage unit. The video switching unit 206, the first video output unit 207, and the second video output unit 208 being the display control unit display the location video thus received and the shared information on the first display unit 25 and the second display unit 26 being a display unit in the displaying position relationship specified in the relationship information stored by the positional relationship retaining unit 205 in the storage unit.

The video receiving unit 209 and the information acquiring unit 210 illustrated in FIGS. 9 and 10 perform the same processes as those according to the first embodiment.

Second Embodiment

A second embodiment of the present invention will now be explained.

Explained in the first embodiment is an example in which each of the teleconference terminals 2 has two display units of the first display unit 25 and the second display unit 26.

Explained in the second embodiment is an example in which each teleconference terminal 2 has a single display unit.

Figure 11:
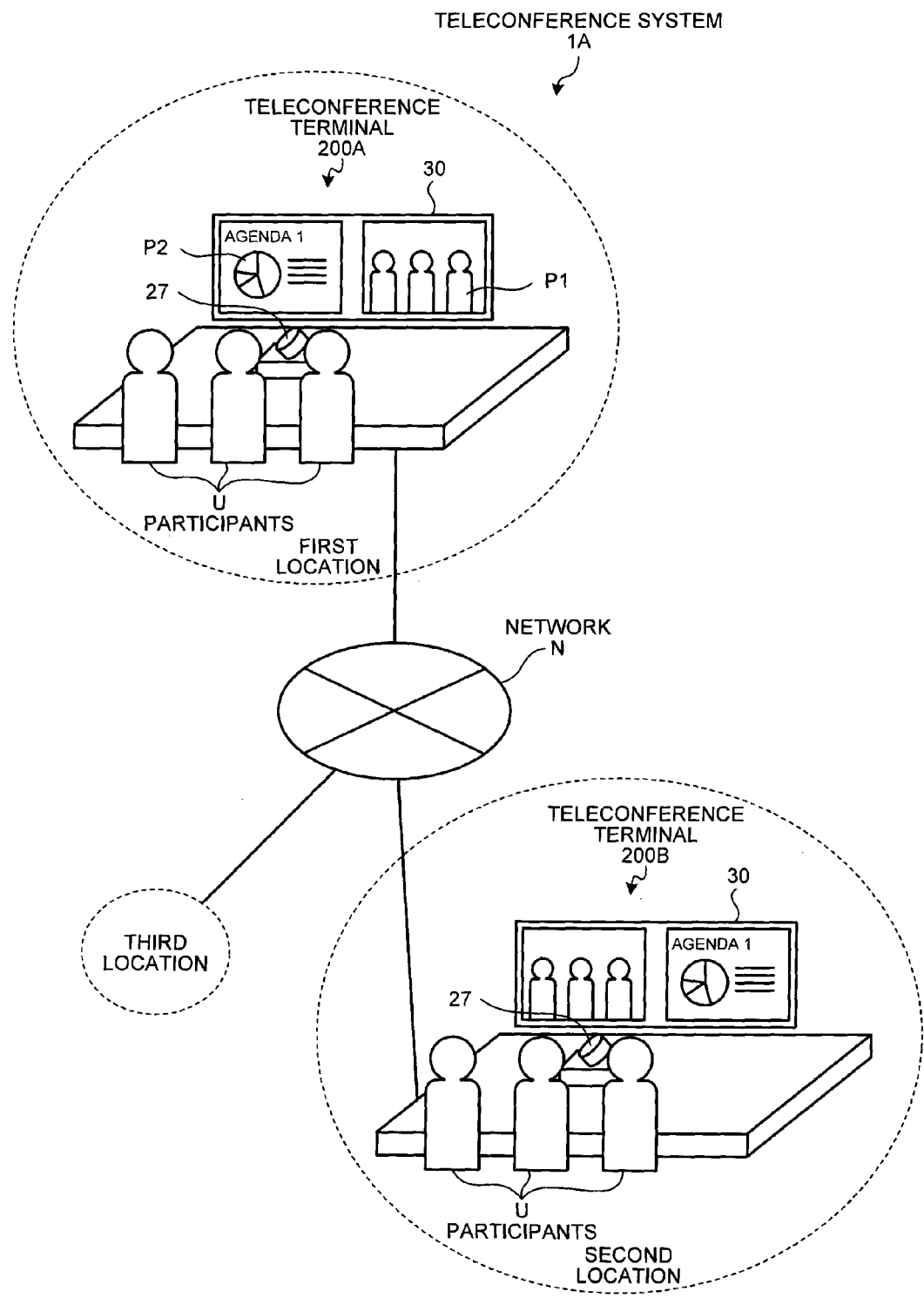
FIG. 11 is a schematic generally illustrating a system configuration of a teleconference system according to a second embodiment of the present invention.
Figure 12:
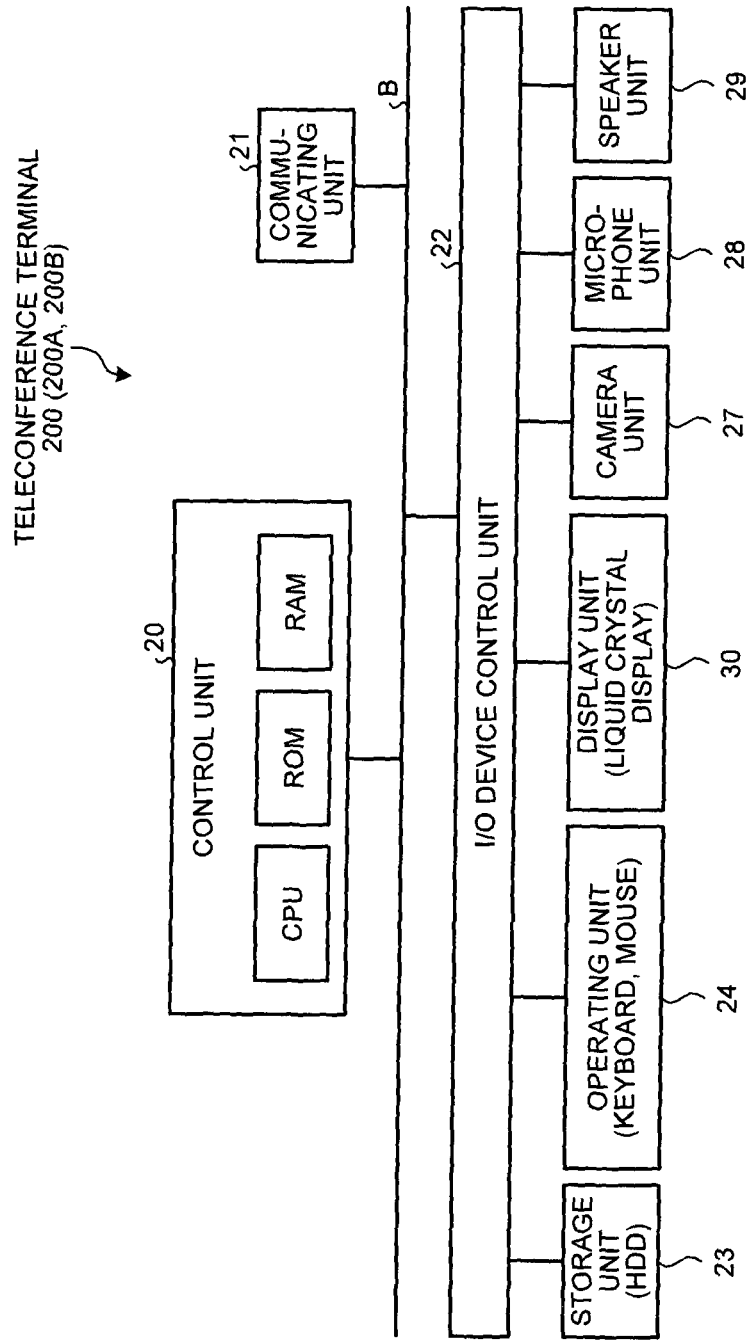
FIG. 12 is a block diagram illustrating a hardware configuration of a control system in a teleconference terminal according to the second embodiment.

FIG. 11 is a schematic generally illustrating a system configuration of a teleconference system 1A according to the second embodiment. FIG. 12 is a block diagram illustrating a hardware configuration of a control system in a teleconference terminal 200 according to the second embodiment. As illustrated in FIGS. 11 and 12, in the teleconference system 1A according to the second embodiment, each of the teleconference terminals 200 includes one display unit 30. Because the remaining hardware configuration is the same as that according to the first embodiment, an explanation thereof is omitted herein.

Figure 13:
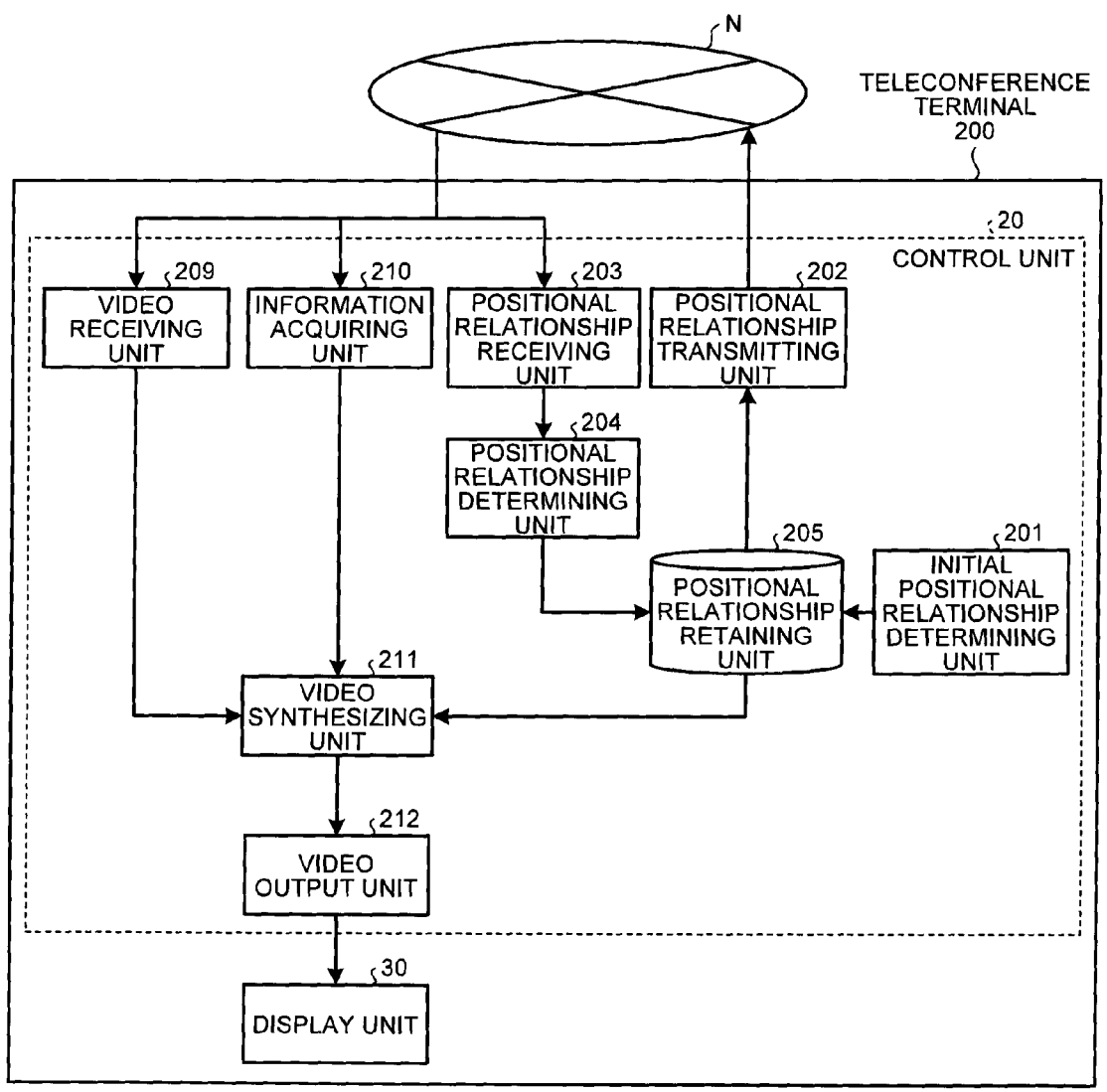
FIG. 13 is a block diagram illustrating a functional configuration of the teleconference terminal according to the second embodiment.

FIG. 13 is a block diagram illustrating a functional configuration of the teleconference terminal 200 according to the second embodiment. As illustrated in FIG. 13, compared with the functional configuration according to the first embodiment, the functional configuration according to the second embodiment is different in including a video synthesizing unit 211 instead of the video switching unit 206, and a video output unit 212 instead of the first video output unit 207 and the second video output unit 208.

The video synthesizing unit 211 synthesizes the location video and the shared information as a video based on the displaying position relationship information retained by the positional relationship retaining unit 205, and outputs the synthesized video to the video output unit 212. More specifically, when information "left" is retained by the positional relationship retaining unit 205, the video synthesizing unit 211 generates video data for allowing the display unit 30 to display the location video on the left side of the shared information, and outputs the video data to the video output unit 212. When information "right" is retained by the positional relationship retaining unit 205, the video synthesizing unit 211 generates video data for allowing the display unit 30 to display the location video on the right side of the shared information, and outputs the video data to the video output unit 212.

Explained in the second embodiment is an example in which the teleconference terminal 200 at each of the locations has functions for transmitting and receiving the displaying position relationship information, as illustrated in FIG. 13, but the present invention is not limited thereto. Alternatively, only the function for transmitting the displaying position relationship information may be provided as illustrated in FIG. 14, or only the function for receiving the displaying position relationship information may be provided as illustrated in FIG. 15, depending on the teleconference terminals 200.

Figure 14:
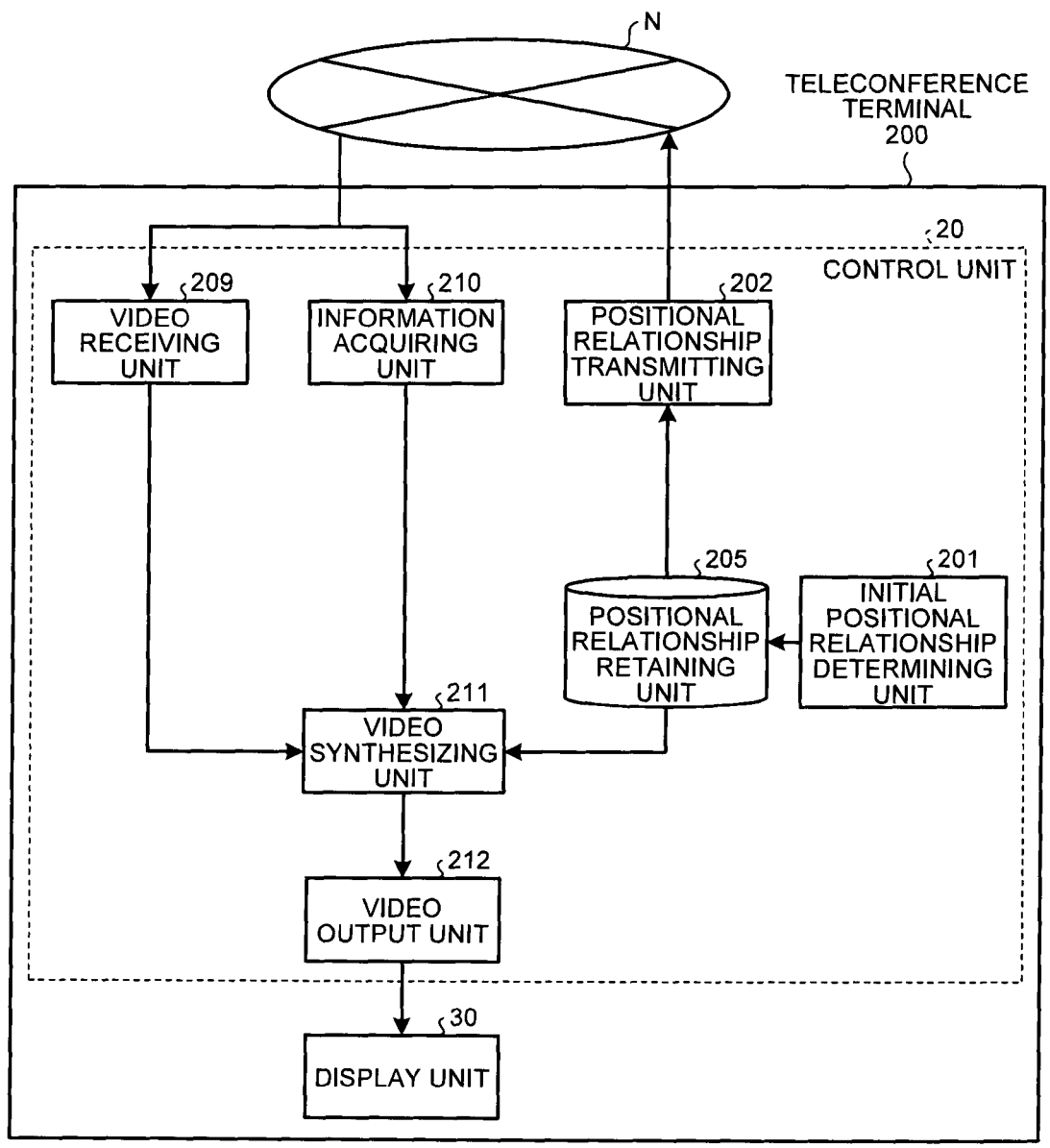
FIG. 14 is a block diagram illustrating a functional configuration according to a variation of the second embodiment.

More specifically, in the teleconference terminal 2 having the functional configuration illustrated in FIG. 14, the initial positional relationship determining unit 201 sets an initial value of the relationship information indicating the displaying position relationship between a location video received from another teleconference terminal 2 and shared information shared among a plurality of locations. The positional relationship retaining unit 205 stores the relationship information set by the initial positional relationship determining unit 201 in a storage unit such as the RAM or the storage unit 23. The positional relationship transmitting unit 202 transmits the relationship information retained by the positional relationship retaining unit 205 to another teleconference terminal 2 when a connection request is received from the other teleconference terminal 2. The video synthesizing unit 211 and the video output unit 212 being the display control unit displays the location video received from another teleconference terminal 2 and the shared information on the display unit 30 being the display unit in the displaying position relationship specified in the relationship information stored by the positional relationship retaining unit 205 in the storage unit.

Figure 15:
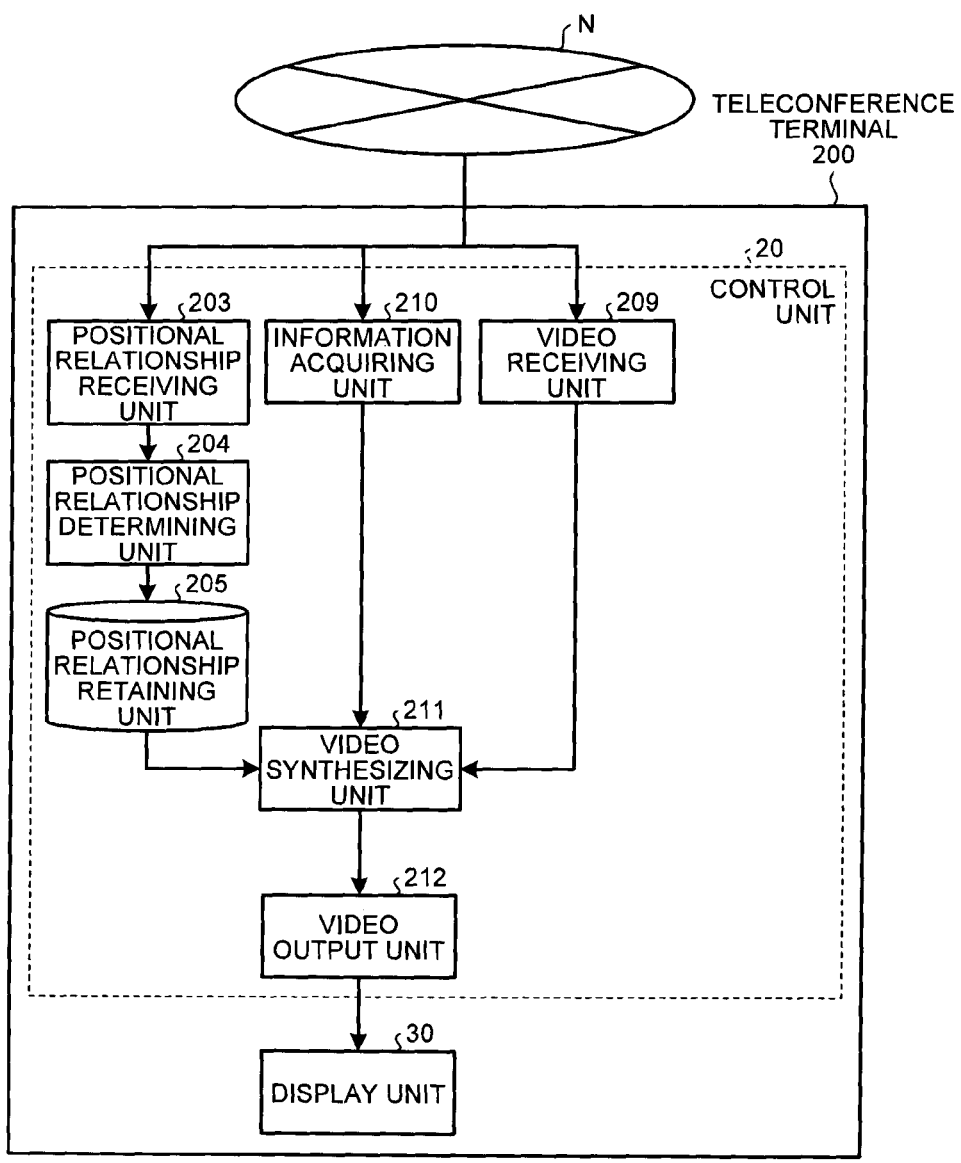
FIG. 15 is a block diagram illustrating a functional configuration according to another variation of the second embodiment.

In the teleconference terminal 2 having the functional configuration illustrated in FIG. 15, the positional relationship receiving unit 203 receives relationship information indicating the displaying position relationship between a location video transmitted by another teleconference terminal 2 and shared information shared among a plurality of locations. The positional relationship determining unit 204 sets relationship information indicating the displaying position relationship between the location video and the shared information on the local teleconference terminal based on the relationship information received by the positional relationship receiving unit 203. The positional relationship retaining unit 205 stores the relationship information set by the positional relationship determining unit 204 in a storage unit. The video synthesizing unit 211 and the video output unit 212 being the display control unit displays the location video thus received and the shared information on the display unit 30 being the display unit in the displaying position relationship specified in the relationship information stored by the positional relationship retaining unit 205 in the storage unit.

The video receiving unit 209 and the information acquiring unit 210 illustrated in FIGS. 14 and 15 perform the same processes as those according to the first embodiment.

As illustrated in FIG. 14, the functional configuration in which the displaying position relationship information is only transmitted is the same as the configuration illustrated in FIG. 13 except the positional relationship receiving unit 203 and the positional relationship determining unit 204 are omitted. As illustrated in FIG. 15, the functional configuration in which the displaying position relationship information is only received is the same as the configuration illustrated in FIG. 13 except the initial positional relationship determining unit 201 and the positional relationship transmitting unit 202 are omitted.

According to the second embodiment, in the teleconference terminal 200 in which the location video and the shared information are displayed side by side in a display screen of one display unit 30, the location video and the shared information can be displayed in a positional relationship where the participants in the electronic conference do not appear to be looking at an awkward direction.

Third Embodiment

A third embodiment of the present invention will now be explained.

Figure 16:
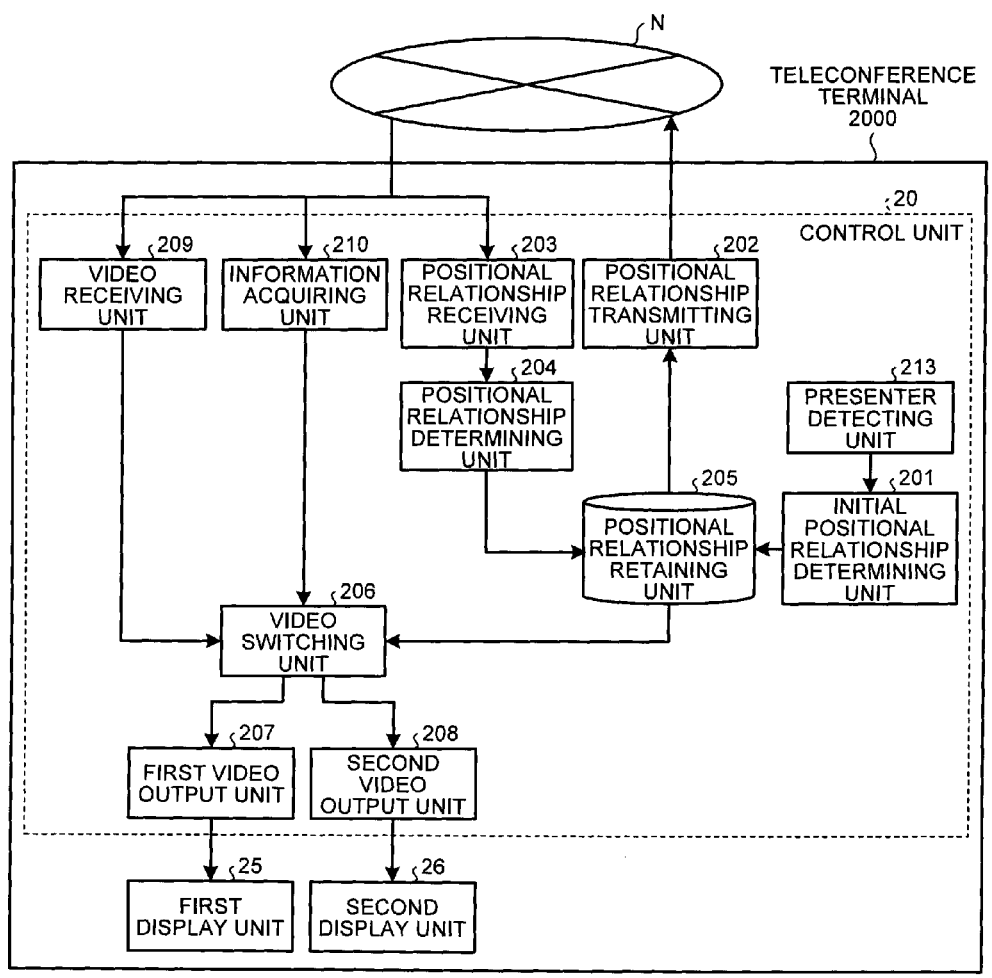
FIG. 16 is a block diagram illustrating a functional configuration of a teleconference terminal in a teleconference system according to a third embodiment of the present invention.

FIG. 16 is a block diagram illustrating a functional configuration of a teleconference terminal 2000 in a teleconference system according to the third embodiment. As illustrated in FIG. 16, compared with the functional configuration according to the first embodiment, the functional configuration according to the third embodiment is different in that a presenter detecting unit 213 is newly added, and different processes are performed by the initial positional relationship determining unit 201 and the positional relationship determining unit 204.

The presenter detecting unit 213 detects presence and the position of a participant making a presentation (hereinafter, sometimes referred to as a presenter) on shared information such as a document based on at least one of a video shot by the camera unit 27 and a voice collected by the microphone unit 28. The participant making a presentation (presenter) herein means a participant positioned beside the shared information, a participant pointing to the shared information with a finger, or a participant saying something about the shared information.

Figure 17:
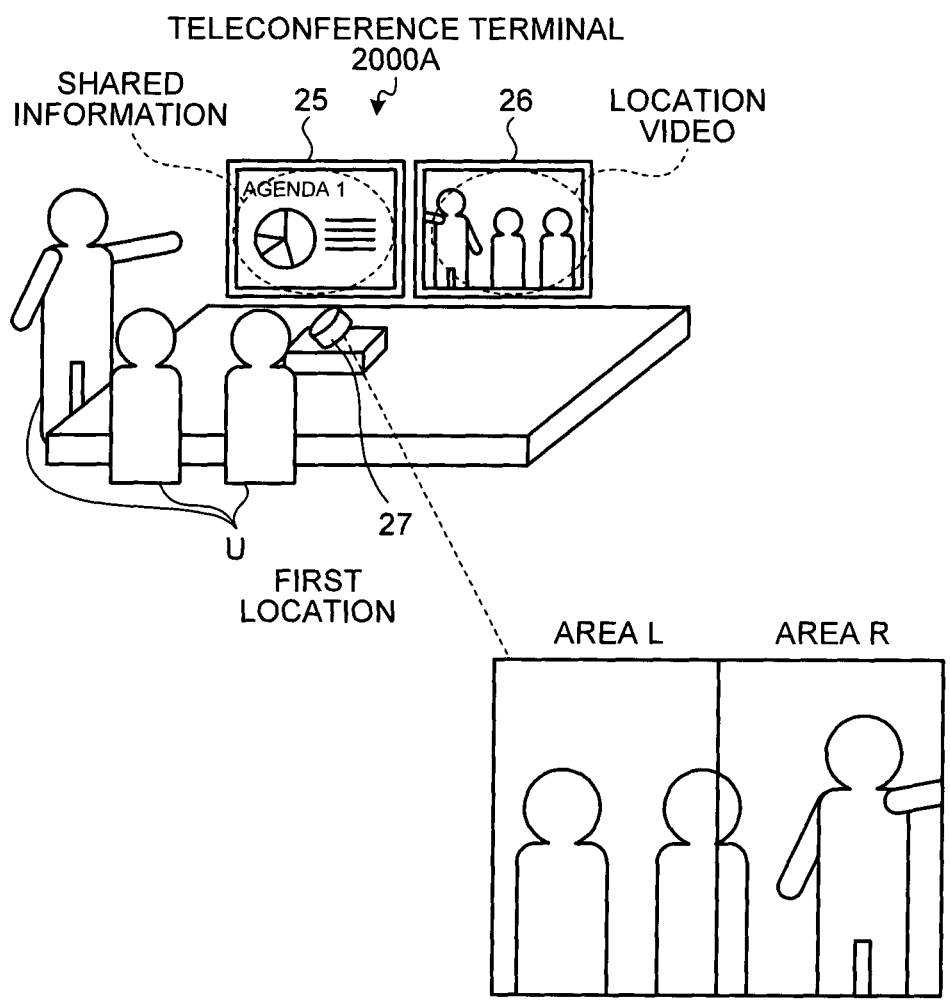
FIG. 17 is a schematic for explaining the position of a presenter detected by a presenter detecting unit.

Specifically, when the presenter detecting unit 213 determines that a presenter is present, the presenter detecting unit 213 determines if the presenter is in an area R that is the right half or in an area L that is the left half of the entire area in the video shot by the camera unit 27, as illustrated in FIG. 17. In the example illustrated in FIG. 17, the presenter detecting unit 213 determines that the presenter is in the area R. The presenter detecting unit 213 detects presence and the position of the presenter by using the technology disclosed in Japanese Patent No. 4389956, for example. Specifically, the presenter detecting unit 213 performs a face recognition process to a video shot by the camera unit 27, and determines if the participant whose face is at a position higher than the other faces by 20 centimeters or more is in the right side (R area) or the left side (area L) of the video.

As another example, the presenter detecting unit 213 performs a face recognition process in a video shot by the camera unit 27, and determines if the participant whose face is at a position closest to the display unit displaying the shared information is in the right side (R area) or the left side (area L) of the video.

The initial positional relationship determining unit 201 according to the third embodiment starts the process when the teleconference terminal 2000 is started. To begin with, the initial positional relationship determining unit 201 starts the presenter detecting unit 213, and causes the presenter detecting unit 213 to detect the position of the presenter. When the presenter detecting unit 213 detects a presenter and determines that the presenter thus detected in the area R in the video, the initial positional relationship determining unit 201 sets information being "right" (information indicating to display the location video on the right side of the shared information) as the displaying position relationship information. When the presenter detecting unit 213 determines that the presenter thus detected in the area L in the video, the initial positional relationship determining unit 201 sets information being "left" as the displaying position relationship information (information indicating to display the location video on the left side of the shared information).

When the presenter detecting unit 213 does not detect any presenter, the initial positional relationship determining unit 201 sets information having been set as the initial value ("left" or "right") as the displaying position relationship information.

The positional relationship determining unit 204 according to the third embodiment sets the displaying position relationship information on the local teleconference terminal again based on the displaying position relationship information received by the positional relationship receiving unit 203 and the position of the presenter detected by the presenter detecting unit 213, and causes the positional relationship retaining unit 205 to retain the displaying position relationship information thus set again.

Figure 18:
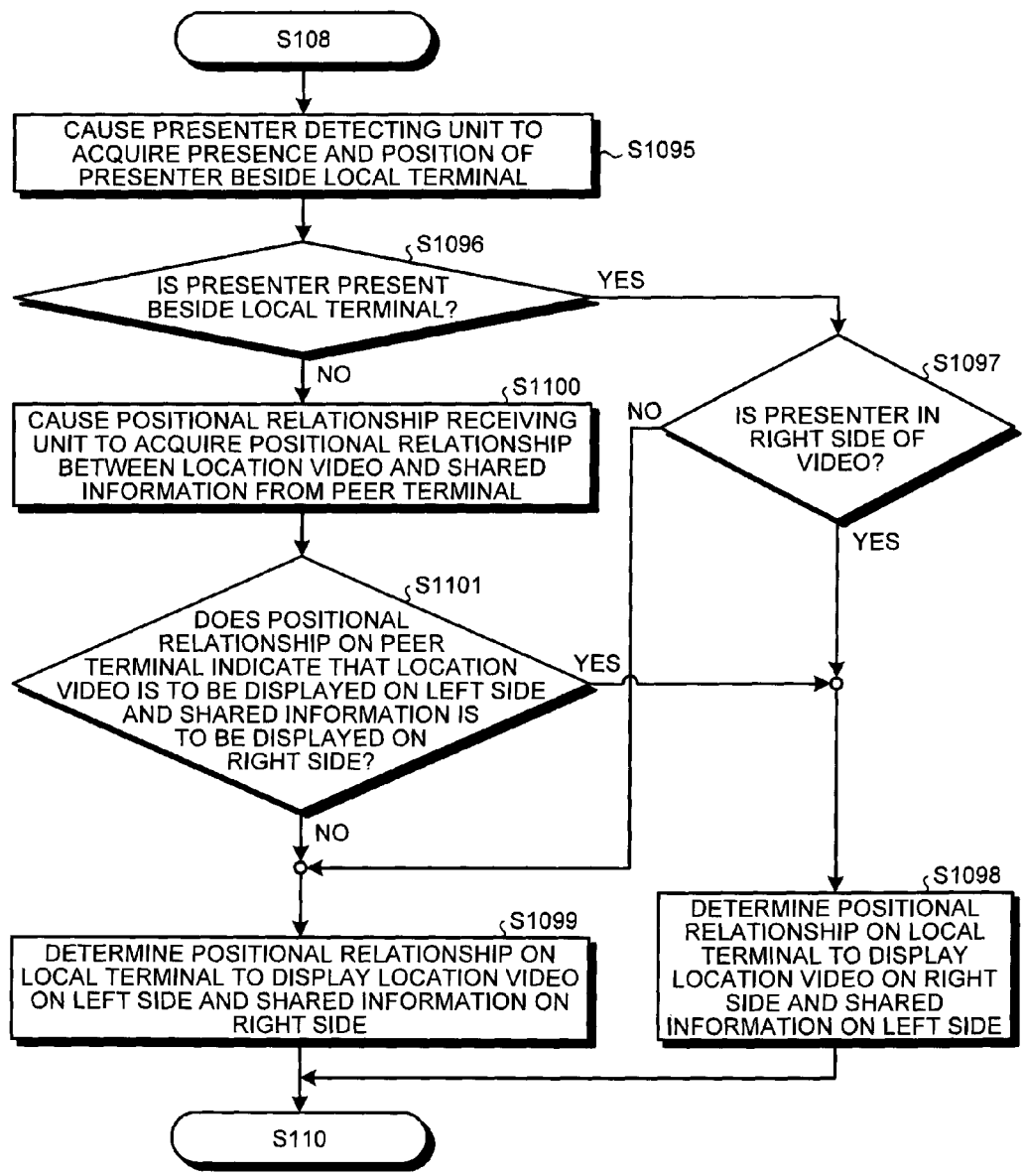
FIG. 18 is a flowchart explaining a process performed by a teleconference system according to the third embodiment at Step S109 in FIG. 5 in detail.

The overall process performed by the teleconference system according to the third embodiment is basically the same as the process performed by the teleconference system 1 according to the first embodiment illustrated in FIG. 5, except that the process at Step S109 in FIG. 5 is replaced with the process illustrated in FIG. 18, instead of the process illustrated in FIG. 6.

FIG. 18 is a flowchart explaining the process performed by the teleconference system according to the third embodiment at Step S109 in FIG. 5 in detail. Used as an example in the explanation below is a process performed by the positional relationship determining unit 204 in the teleconference terminal 2000B deployed in the second location.

As illustrated in FIG. 18, in the third embodiment, in the process at Step S109, to begin with, the positional relationship determining unit 204 acquires information indicating the presence and the position of a presenter from the local presenter detecting unit 213 (Step S1095).

The positional relationship determining unit 204 then determines if a presenter is present near the local teleconference terminal 2000B based on the information acquired at Step S1095 (Step S1096).

As a result of the determination, if the positional relationship determining unit 204 determines that a presenter is present (Yes at Step S1096), the positional relationship determining unit 204 then determines if the presenter is in the area R (right side) in the video (Step S1097). As a result of the determination, if the positional relationship determining unit 204 determines that the presenter is in the area R (Yes at Step S1097), the positional relationship determining unit 204 sets "right" as the displaying position relationship information on the local teleconference terminal (on the teleconference terminals 2000B). In other words, the positional relationship determining unit 204 sets to display the location video on the right side of the shared information (Step S1098). If the positional relationship determining unit 204 determines that the presenter is not in the area R, that is, the presenter is in the area L (left side) as a result of the determination at Step S1097 (No at Step S1097), the positional relationship determining unit 204 sets "left" as the displaying position relationship information on the local teleconference terminal (on the teleconference terminals 2000B). In other words, the positional relationship determining unit 204 sets to display the location video on the left side of the shared information (Step S1099).

If the positional relationship determining unit 204 determines that a presenter is not present as a result of determination at Step S1096 (No at Step S1096), the positional relationship determining unit 204 acquires displaying position relationship information set on a teleconference terminal 2000A from the positional relationship receiving unit 203 (Step S1100). The positional relationship determining unit 204 then determines if the displaying position relationship information thus acquired is "left", in other words, if the displaying position relationship information thus acquired is set to display the location video on the left side of the shared information in the teleconference terminal 2000A being a peer (Step S1101).

If the positional relationship determining unit 204 determines that the displaying position relationship information is "left", in other words, if the positional relationship determining unit 204 determines that the displaying position relationship information is set to display the location video on the left side of the shared information in the teleconference terminal 2000A being a peer as a result of the determination (Yes at Step S1101), the system control goes to Step S1098 and the same processes are performed subsequently. If the positional relationship determining unit 204 determines that the displaying position relationship information is "right", in other words, if the positional relationship determining unit 204 determines that the displaying position relationship information is set to display the location video on the right side of the shared information in the teleconference terminal 2000A being a peer as a result of determination at Step S1101 (No at Step S1101), the system control goes to Step S1099 and the same processes are performed subsequently.

In the third embodiment, when the process at Step S1098 or Step S1099 is performed after going to the determining process at Step S1097 in FIG. 18, the teleconference terminal 2000B requesting a connection transmits the displaying position relationship information on the local teleconference terminal retained by the positional relationship retaining unit 205 to the teleconference terminal 2000A being a peer. The positional relationship determining unit 204 in the teleconference terminal 2000A then sets the displaying position relationship information on the local teleconference terminal again based on the displaying position relationship information received by the positional relationship receiving unit 203.

Figure 19:
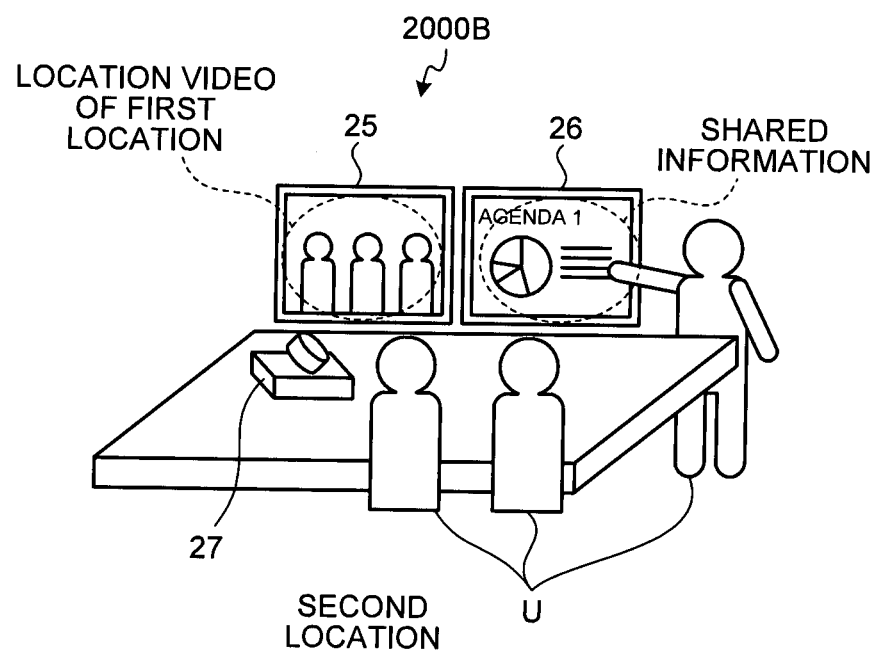
FIG. 19 is a schematic for explaining an advantageous effect achieved by the third embodiment.
Figure 20:
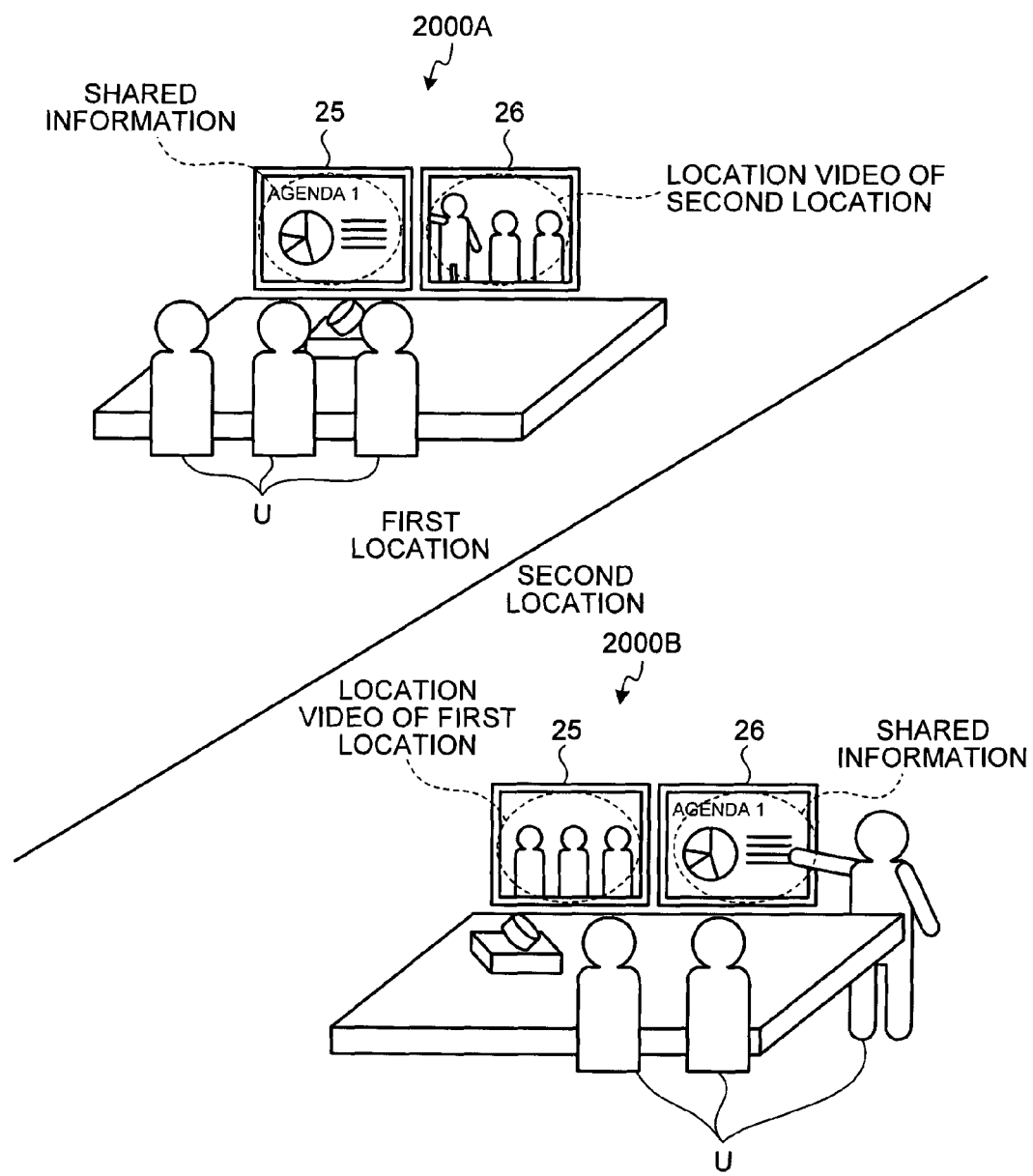
FIG. 20 is a schematic for explaining an advantageous effect achieved by the third embodiment.

According to the third embodiment, for example, when a presenter is beside the second display unit 26 in the second location, as illustrated in FIG. 19, the teleconference terminal 2000B in the second location displays the location video on the left side of the shared information as illustrated in FIG. 20, through the processes illustrated in FIG. 5 and FIG. 18. At the same time, the teleconference terminal 2000A in the first location displays the location video on the right side of the shared information. In this manner, on the teleconference terminal 2000A in the first location, the presenter in the second location displayed in the second display unit 26 appears as making presentation pointing to the shared information displayed on the first display unit 25. On the teleconference terminal 2000B in the second location, the participant in the first location displayed in the first display unit 25 appears as looking at the shared information displayed in the second display unit 26. Therefore, a sense of the participants paying attention to shared information such as a document can be created smoothly among a plurality of locations where the electronic conference is being held.

Figure 21:
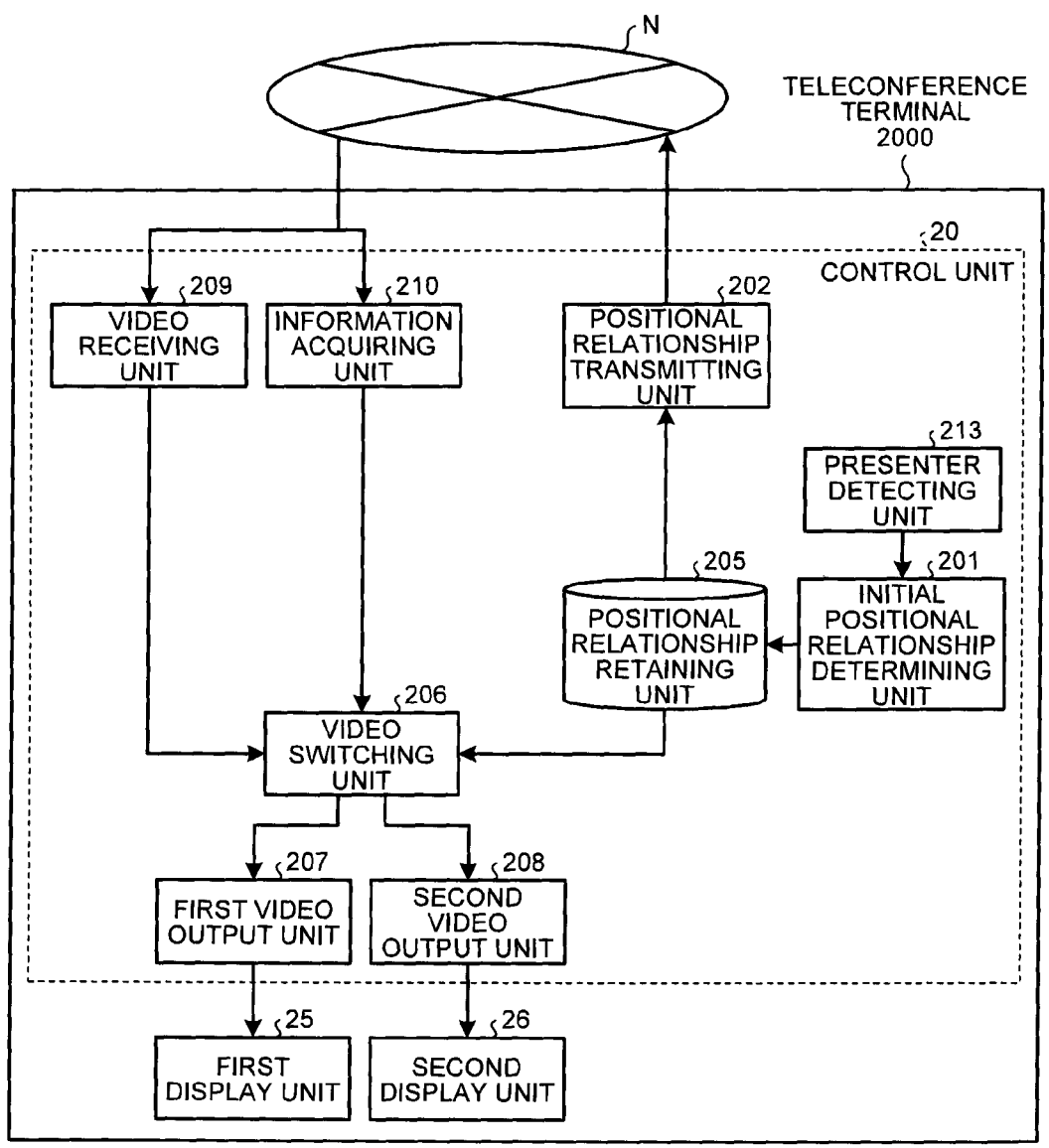
FIG. 21 is a block diagram illustrating a functional configuration according to a variation of the third embodiment.

Furthermore, explained in the third embodiment is an example in which the teleconference terminal 2000 at each of the locations has functions for transmitting and receiving the displaying position relationship information, as illustrated in FIG. 16, but the present invention is not limited thereto, and only the function for transmitting the displaying position relationship information may be provided depending on the teleconference terminal 2000, as illustrated in FIG. 21.

As illustrated in FIG. 21, the functional configuration in which the displaying position relationship information is only transmitted is the same as the configuration illustrated in FIG. 16 except the positional relationship receiving unit 203 and the positional relationship determining unit 204 are omitted.

Some exemplary embodiments of the present invention are explained above, but embodiments are not limited to those explained above.

For example, in the configuration explained the embodiments above, each of the teleconference terminals 2, 200, 2000 communicates with each other. However, the present invention is not limited thereto, and the teleconference system may also include a server provided with a storage unit for storing therein shared information.

Furthermore, in the embodiments explained above, the hardware configuration illustrated in FIG. 2 or FIG. 12 is provided as an example of the hardware configuration of the control system in each of the teleconference terminals 2, 200, 2000. However, the present invention is not limited thereto, and the hardware configuration may be any other hardware configuration.

The computer program for causing the CPU in the control unit 20 to execute the processes according to the embodiment may be provided in a manner incorporated in a storage unit such as the ROM in each of the teleconference terminals 2, 200, 2000 in advance. Furthermore, such a computer program may be provided in a manner stored in a computer-readable storage medium as a file in an installable or executable format. Furthermore, the computer program can be provided or distributed over a network such as the Internet.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A communication system, comprising:
   a first communication terminal at a first location being connected to at least a first display and a second display disposed adjacent to each other, the first communication terminal including first circuitry configured to set display positions, as first position relationship information, of (i) a video of a second location received from a second communication terminal to be one of the first display and the second display, and (ii) image data of shared information that is shared between the first communication terminal and the second communication terminal to be the other of the first display and the second display, and
   the second communication terminal at the second location being connected to at least a first display and a second display disposed adjacent to each other, the second communication terminal including second circuitry configured to receive the first position relationship information, and to set display positions, as second position relationship information, of (i) a video of the first location received from the first communication terminal to be one of the first display and the second display connected to the second communication terminal, and (ii) the image data of shared information that is shared between the first communication terminal and the second communication terminal to be the other of the first display and the second display connected to the second communication terminal, based on the received first position relationship information, such that the video of the first location and the image data of the shared information are set to be displayed on the first display and the second display connected to the second communication terminal in an opposite manner as the video of the second location and the image data of the shared information are set on the first and second display connected to the first communication terminal,
   wherein the second circuitry is configured to control display of the video of the first location and the image data of the shared information on the first display and the second display connected to the second communication terminal based on the set second position relationship information.

2. The communication system according to claim 1, wherein the second circuitry is further configured to:
   set an initial value of the second position relationship information;
   store the set initial value of the second position relationship information in a memory;
   transmit the stored second position relationship information to another communication terminal when a connection request is received from the other communication terminal;

receive displaying position relationship information transmitted from the other communication terminal; and reset the second position relationship information based on the displaying position relationship information received from the other communication terminal.

3. The communication system according to claim 2, the second circuitry being further configured to generate a synthesize video for displaying the video received from the other communication terminal and the shared information on one display connected to the second communication terminal, and control display of the synthesized video on the one display.

4. The communication system according to claim 2, wherein the second circuitry is further configured to detect a position of a presenter making a presentation on the shared information, based on at least one of a video captured by an image capturing unit and sound collected by a sound collecting unit, set the initial value of the second position relationship information based on the detected position of the presenter, and reset the second position relationship information based on the received first position relationship information and the detected position.

5. A communication terminal configured to communicate with another communication terminal at a first location, the other communication terminal being connected to at least a first display and a second display disposed adjacent to each other, the other communication terminal including circuitry configured to set display positions, as first position relationship information, of (i) a video of a second location received from the communication terminal to be one of the first display and the second display, and (ii) image data of shared information that is shared between the other communication terminal and the communication terminal to be the other of the first display and the second display, the present communication terminal being configured to connect to a first display and a second display disposed adjacent to each other at the second location and further comprising:

circuitry configured to receive the first position relationship information, and to set display positions, as second position relationship information, of (i) a video of the first location received from the other communication terminal to be one of the first display and the second display connected to the communication terminal, and (ii) the image data of shared information that is shared between the other communication terminal and the communication terminal to be the other of the first display and the second display connected to the communication terminal, based on the received first position relationship information, such that the video of the first location and the image data of the shared information are set to be displayed on the first display and the second display connected to the communication terminal in an opposite manner as the video of the second location and the image data of the shared information are set on the first and second display connected to the other communication terminal, wherein the circuitry of the communication terminal is configured to control display of the video of the first location and the image data of the shared information on the first display and the second display connected to the communication terminal based on the set second position relationship information.

6. A method implemented by a communication terminal configured to communicate with another communication terminal at a first location, the other communication terminal being connected to at least a first display and a second display disposed adjacent to each other, the other communication terminal including circuitry configured to set display positions, as first position relationship information, of (i) a video of a second location received from the communication terminal to be one of the first display and the second display, and (ii) image data of shared information that is shared between the other communication terminal and the communication terminal to be the other of the first display and the second display, the present communication terminal being configured to connect to a first display and a second display disposed adjacent to each other at the second location, the method comprising:

receiving the first position relationship information;

setting display positions, as second position relationship information, of (i) a video of the first location received from the other communication terminal to be one of the first display and the second display connected to the communication terminal, and (ii) the image data of shared information that is shared between the other communication terminal and the communication terminal to be the other of the first display and the second display connected to the communication terminal, based on the received first position relationship information, such that the video of the first location and the image data of the shared information is set to be displayed on the first display and the second display connected to the communication terminal in an opposite manner as the video of the second location and the image data of the shared information are set on the first and second display connected to the other communication terminal; and controlling display of the video of the first location and the image data of the shared information on the first display and the second display connected to the communication terminal based on the set second position relationship information.

\* \* \* \* \*